United States Patent
Komatsu

(10) Patent No.: US 8,289,417 B2
(45) Date of Patent: Oct. 16, 2012

(54) IMAGING DEVICE

(75) Inventor: Koji Komatsu, Tokyo (JP)

(73) Assignee: Sony Corporation, Tokyo (JP)

(*) Notice: Subject to any disclaimer, the term of this patent is extended or adjusted under 35 U.S.C. 154(b) by 585 days.

(21) Appl. No.: 12/570,274

(22) Filed: Sep. 30, 2009

(65) Prior Publication Data

US 2010/0141793 A1    Jun. 10, 2010

(30) Foreign Application Priority Data

Sep. 30, 2008  (JP) ................................. 2008-253972

(51) Int. Cl.
*H04N 5/76* (2006.01)
*H04N 5/222* (2006.01)

(52) U.S. Cl. .............. 348/231.9; 348/231.2; 348/333.05

(58) Field of Classification Search ............... 348/231.9, 348/231.2, 333.05
See application file for complete search history.

(56) References Cited

U.S. PATENT DOCUMENTS

| | | | | |
|---|---|---|---|---|
| 7,466,357 B2* | 12/2008 | Myojo | ...................... | 348/333.05 |
| 7,616,861 B2* | 11/2009 | Takahashi | .................. | 348/207.1 |
| 2001/0022624 A1* | 9/2001 | Tanaka et al. | ............. | 348/333.02 |
| 2002/0067420 A1* | 6/2002 | Oeda et al. | ................ | 348/333.05 |
| 2003/0146977 A1* | 8/2003 | Vale et al. | .................. | 348/207.1 |
| 2004/0056956 A1* | 3/2004 | Gardiner et al. | ........... | 348/207.1 |
| 2004/0109062 A1* | 6/2004 | Yamaya | ...................... | 348/207.1 |
| 2006/0109349 A1* | 5/2006 | Takashima | .................. | 348/207.1 |
| 2006/0165380 A1* | 7/2006 | Tanaka et al. | .................... | 386/95 |
| 2007/0081088 A1* | 4/2007 | Gotoh et al. | ............. | 348/333.01 |
| 2008/0297607 A1* | 12/2008 | Minatogawa | .............. | 348/207.1 |

FOREIGN PATENT DOCUMENTS

JP  3622691  12/2004

OTHER PUBLICATIONS

U.S. Appl. No. 12/570,740, filed Sep. 30, 2009, Komatsu.

* cited by examiner

*Primary Examiner* — Sinh Tran
*Assistant Examiner* — Jason Flohre
(74) *Attorney, Agent, or Firm* — Oblon, Spivak, McClelland, Maier & Neustadt, L.L.P.

(57) ABSTRACT

There is provided an imaging device including a first processor having a list creating unit for, when a group is specified and a creation process of a data list is requested for data divided to one or a plurality of groups, creating a data list related to data of the specified group, and a list transmission unit for transmitting a data list created by the list creating unit through a first line when a transmission request of the data list based on the PTP is acquired through the first line; and a second processor having a list creation requesting unit for specifying the group and requesting for the creation process of the data list with respect to the first processor through a second line different from the first line, and a list transmission requesting unit for transmitting the transmission request of the data list to the first processor.

7 Claims, 20 Drawing Sheets

CONFIGURATION OF ACTUAL FOLDER

FIG.8

ONE EXAMPLE OF OBJECT HANDLING LIST OF GENERAL PTP

| OBJECT HANDLE NUMBER | ATTRIBUTE | OBJECT |
|---|---|---|
| 00000001 | FOLDER | ROOT |
| 01000001 | FOLDER | 100MSDCF |
| 01010001 | FILE | DSC01.JPG |
| 01020001 | FILE | DSC02.JPG |
| 01030001 | FILE | DSC03.JPG |
| 01040001 | FILE | DSC04.JPG |
| 01050001 | FILE | DSC05.JPG |
| 01060001 | FILE | DSC06.JPG |
| 01070001 | FILE | DSC07.JPG |
| 01080001 | FILE | DSC08.JPG |
| 01000002 | FOLDER | 101MSDCF |
| 01010002 | FILE | DSC09.JPG |

FIG.9

ONE EXAMPLE OF OBJECT HANDLING LIST

| OBJECT HANDLE NUMBER | ATTRIBUTE | OBJECT |
|---|---|---|
| 00000001 | FOLDER | ROOT |
| 01000001 | FOLDER | 100MSDCF |
| 01010001 | FILE | DSC01.JPG |
| 01020001 | FILE | DSC02.JPG |
| 01030001 | FILE | DSC03.JPG |
| 01040001 | FILE | DSC04.JPG |
| 01050001 | FILE | DSC05.JPG |
| 01060001 | FILE | DSC06.JPG |
| 01070001 | FILE | DSC07.JPG |
| 01080001 | FILE | DSC08.JPG |
| 01000002 | FOLDER | 101MSDCF |
| 01010002 | FILE | DSC09.JPG |
| 02000001 | FOLDER | FAVORITE 1 |
| 02010001 | FILE | DSC01.JPG |
| 02020001 | FILE | DSC02.JPG |
| 02030001 | FILE | DSC04.JPG |
| 02000002 | FOLDER | FAVORITE 2 |
| 02010002 | FILE | DSC03.JPG |
| 02000003 | FOLDER | FAVORITE 3 |
| 02010003 | FILE | DSC05.JPG |
| 02020003 | FILE | DSC07.JPG |
| 02030003 | FILE | DSC08.JPG |
| 02040003 | FILE | DSC09.JPG |

ACTUAL FOLDER PORTION: rows from 00000001 through 01010002

VIRTUAL FOLDER PORTION: rows from 02000001 through 02040003

FIG.10

ONE EXAMPLE OF OBJECT HANDLING LIST

| OBJECT HANDLE NUMBER | ATTRIBUTE | OBJECT |
|---|---|---|
| 02000001 | FOLDER | FAVORITE 1 |
| 02010001 | FILE | DSC01.JPG |
| 02020001 | FILE | DSC02.JPG |
| 02030001 | FILE | DSC04.JPG |
| 02000002 | FOLDER | FAVORITE 2 |
| 02010002 | FILE | DSC03.JPG |
| 02000003 | FOLDER | FAVORITE 3 |
| 02010003 | FILE | DSC05.JPG |
| 02020003 | FILE | DSC07.JPG |
| 02030003 | FILE | DSC08.JPG |
| 02040003 | FILE | DSC09.JPG |

INITIALIZATION PROCESS WHEN POWER ON

IMAGING DEVICE

BACKGROUND OF THE INVENTION

1. Field of the Invention

The present invention relates to an imaging device.

2. Description of the Related Art

Video data and audio data can be used in the form of digital data with significant progress in the information processing technique and the communication technique. The broadcast data received with a broadcasting device or the image data photographed with the imaging device are moved to various types of information processing devices, portable devices, and the like, and managed and viewed or listened in the devices of the moved destination. In particular, the still image data and the moving image data photographed with the imaging device are often moved to and reproduced at a large-screen television receiver or a personal computer (hereinafter referred to as PC). In this case, a connection interface called USB (Universal Serial Bus) is used for the movement of data.

Some USB interfaces are based on a mass storage class interface and some are based on a still image class interface. The data transmission protocol in the still image class interface includes PTP (Picture Transfer Protocol). The PTP is literally a protocol used in transmitting the image data using the USB interface. For instance, the image data is transmitted according to the PTP between the imaging device and the PC connected with the USB interface. With regards to the transmission method of the image data, Japanese Patent No. 3622691 discloses a technique for realizing the transmission of information related to the association of the image and the category in the framework of the PTP with respect to the categorized images.

SUMMARY OF THE INVENTION

In the PTP, a list of images and the like (object handling list) recorded in the imaging device is transmitted beforehand when transmitting the image from the imaging device to the PC. It is difficult to grasp the directory structure from the object handling list even if the imaging device is managing the image data with the directory structure. Thus, in order for the PC to grasp the directory structure, the directory stored with each image is to be inquired to the imaging device for every image. As a result, the time for grasping the directory structure becomes long in proportion to the number of images. Furthermore, if the images are classified into categories or groups, the object handling list is required to acquire the information of such categories or groups.

However, the acquiring time of the object handling list becomes longer, the greater the number of images as the size of the object handling list also becomes large in proportion to the number of images. For instance, if a time of about 20 milliseconds is necessary for one image to execute such processes, a time of about 80 seconds is necessary if the number of images is 4000. Normally, when the user views the image, the image or the image list the user actually desires to display is often limited to a few. When displaying only the list of images or displaying only the category of the images, it is very inefficient to acquire the object handling list including the information of all images.

The present invention addresses the above-identified, and other issues associated with conventional methods and apparatuses, and it is desirable to provide a new and improved imaging device capable of increasing the speed in the display of classification information such as categories or groups.

In order to solve the above issue, according to an embodiment of the present invention, there is provided an imaging device including: a first processing unit including, a list creating unit for, when a group is specified and a creation process of a data list is requested for data divided into groups, creating a data list related to data of the specified group, and a list transmission unit for transmitting the created data list through a first signal line when a transmission request of the data list based on a PTP (Picture Transfer Protocol) is acquired through the first signal line; and a second processing unit including a list creation requesting unit for specifying the group and requesting for the creation process of the data list with respect to the first processing unit through a second signal line different from the first signal line and a list transmission requesting unit for transmitting the transmission request of the data list to the first processing unit.

The list creating unit may be configured to notify that the creation process of the data list is completed to the second processing unit through the second signal line after the creation process of the data list is completed. In that case, the list transmission requesting unit transmits the transmission request of the data list when notified that the creation process of the data list is completed.

The list creating unit may be configured to generate a data list containing information related to a lower level group of the specified group if the group has a hierarchical structure. In that case, the second processing unit further includes a number of lower level group detection unit for detecting number of lower level groups based on the data list acquired from the first processing unit and a group object display unit for displaying a group object for selecting the lower level group on a screen based on the number of groups.

The second processing unit may further include a number of data detection unit for detecting number of data belonging to the specified group based on the data list acquired from the first processing unit and a data object display unit for displaying a data object for selecting the data on a screen based on the number of data detected by the number of data detection unit.

The first processing unit may further include a data object transmission unit for transmitting the data object through the first signal line. In this case, the second processing unit further includes a data object acquiring unit for acquiring the data object from the first processing unit through the first signal line. Then, the data object acquiring unit acquires the data object by number of data objects displayable on the screen when the number of data is greater than the number of data objects displayable on the screen. Further, the data object display unit displays the data object acquired by the data object acquiring unit on the screen.

The data object acquiring unit may be configured to acquire a data object corresponding to data of a group different from the specified group when the number of data detected by the number of data detection unit is smaller than the number of data objects displayable on the screen. In this case, the data object display unit displays the data object corresponding to the different group on the screen in addition to the data object corresponding to the specified group.

The group may be a virtual folder corresponded with the data according to an arbitrary setting operation by a user irrespective of a folder storing the data.

In order to solve the above issue, according to another embodiment of the present invention, there is provided a program for causing a computer to realize the function of each component of the imaging device. There can be also provided a recording medium recorded with such program. In order to solve the above issue, according to another further embodiment of the present invention, there can be provided an image processing device mounted with the function of each component of the imaging device.

According to the embodiments of the present invention described above, the speed of the display of classification information such as categories and groups can be increased.

BRIEF DESCRIPTION OF THE DRAWINGS

FIG. 8 shows a configuration example of the object handling list;

FIG. 9 shows a configuration example of the object handling list;

FIG. 10 shows a configuration example of the object handling list;

DETAILED DESCRIPTION OF THE PREFERRED EMBODIMENTS

Figure 1:
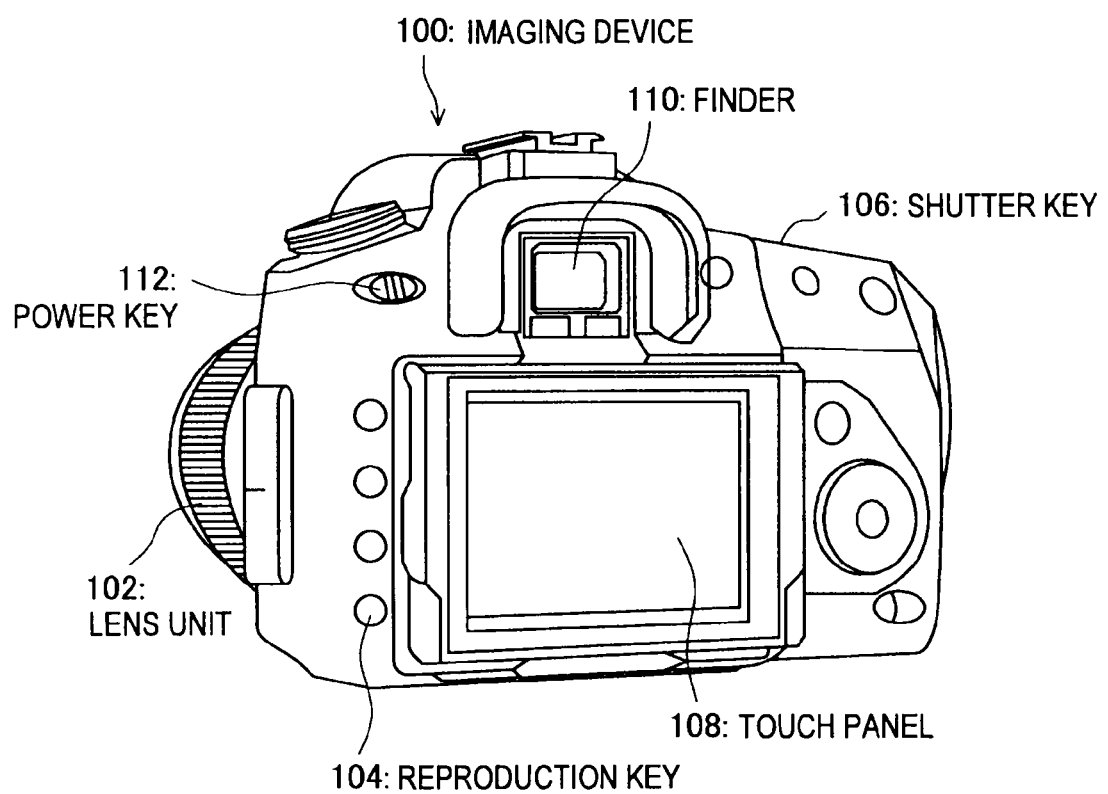
FIG. 1 shows an outer appearance of an imaging device according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of description related to the embodiment of the present invention described below will be briefly described. First, the outer appearance of an imaging device 100 according to the present embodiment is shown in FIG. 1, and the device configuration of the imaging device 100 will be schematically described with reference to the drawing. The function configuration of the imaging device 100 will then be described with reference to FIG. 2. The configuration of an actual folder in which the image data are stored in the imaging device 100, the configuration of a virtual folder, and a database structure will be described with reference to FIGS. 3 to 5.

The display control method of an image selection screen by the imaging device 100 will be described with reference to FIGS. 6 and 7. Among them, the transmission method of data by the imaging device 100 will be described in detail with reference to FIG. 7. Furthermore, the configuration of an object handling list managed in the imaging device 100 will be described with reference to FIGS. 8, 9 and 10. The configuration of the transmission frame used when making an acquiring request of the image data will then be described with reference to FIG. 11.

The flow of the control process executed when the power of the imaging device 100 is turned ON will be described with reference to FIG. 12. The flow of the display control process of a category selection screen in the imaging device 100 will be described with reference to FIG. 13. The flow of the display control process in a virtual folder selection screen in the imaging device 100 will be described with reference to FIG. 14. The flow of the display control process of the image selection screen in the imaging device 100 will be described with reference to FIG. 15. The flow of the image registration process to the virtual folder (favorite) in the imaging device 100 will be described with reference to FIG. 16.

The flow of the initialization process executed when the power of the imaging device 100 is turned ON will be described with reference to FIG. 17. The flow of the category selection process in the imaging device 100 will be described with reference to FIG. 18. The flow of the selection process of the virtual folder (favorite) in the imaging device 100 will be described with reference to FIG. 19. The flow of the image registration process to the virtual folder (favorite) in the imaging device 100 will be described with reference to FIG. 20. The operation input steps of the user are implicitly included in the flow of processes shown in FIGS. 17 to 20, and an interactive interaction state between the user and the imaging device 100 is implied.

Lastly, the technical concept of the embodiment will be summarized, and the effects obtained from such technical concept will be briefly described.

DISPLAY OF DESCRIPTION ITEMS

1: Outer appearance of imaging device 100
2: Function configuration of imaging device 100
3: Display control method of image selection screen
4: Flow of control process by imaging device 100
5: Control process and operation input
6: Conclusion

Embodiment

One embodiment of the present invention will be described. The present embodiment relates to a method of efficiently acquiring the information related to the image and the category of the information related to the images divided into categories in a system for transmitting images using the PTP. In particular, the present embodiment relates to a technique of efficiently acquiring the information of the category and increasing the speed in the display of the information related to the category.

1: OUTER APPEARANCE OF IMAGING DEVICE 100

First, the outer appearance and the device configuration of the imaging device 100 according to the present embodiment will be schematically described with reference to FIG. 1. FIG. 1 is an explanatory view showing the outer appearance of the imaging device 100 according to the present embodiment. The shape of the imaging device 100 shown in FIG. 1 is an example, and the scope in which the technique of the present embodiment is applied is not limited to the device having the outer appearance of FIG. 1.

As shown in FIG. 1, the imaging device 100 mainly includes a lens unit 102, a reproduce key 104, a shutter key 106, a touch panel 108, a finder 110, and a power key 112.

The lens unit 102 configures the optical system of the imaging device 100. The light entered through the lens unit 102 is provided to an imaging element arranged at the interior of the imaging device 100, and then converted to an electrical signal. The image data of a subject image thereby forms by the electrical signal output from the imaging element. The image data of the subject image is recorded in a storage means or a recording media arranged inside the imaging device 100. The recorded image data is displayed on the touch panel 108 by operating the reproduce key 104. That is, the reproduce key 104 is an operation key for switching to a browse mode of the image data. The switching operation of the image data, and the like is carried out using the touch panel 108 or other operation keys.

The shutter key 106 is an operation key used to release the shutter when photographing the subject. For instance, when the shutter key 106 is half-pressed, the focus is adjusted by an auto focus mechanism arranged at the lens unit 102 and the like. When the shutter key 106 is deeply pressed, the shutter is released and the subject image is photographed. As described above, the image data of the subject image is recorded in the storage means or the recording media. The image data of the subject image is displayed on the touch panel 108 by operating the reproduce key 104. In addition to the image data, operation screens and the like are also displayed on the touch panel 108. When the surface is touched with a finger or a stylus, the touch panel 108 detects information of the contacting position, the movement path, and the like.

The finger 110 is a window used to visually recognize the image of the subject seen through the lens unit 102. For instance, the user looks into the finder 100 and checks the imaging range, the focus, and the like, and then presses the shutter key 106 when photographing the subject image. If the imaged image is displayed on the touch panel 108, the user may check the imaged image displayed on the touch panel 108, and operate the shutter key 106. The power key 112 is an operation key for turning ON/OFF the power of the imaging device 100. Therefore, the user first operates the power key 112 when starting photographing.

The outer appearance and the like of the imaging device 100 have been described above. It can be recognized that the imaging device 100 is mounted with a photographing mechanism for photographing the subject. The imaging device 100 also includes the touch panel 108 as a display means of the photographed image data. The imaging device 100 includes the reproduce key 104 and the touch panel 108 as operation means used in the image data selecting operation, reproducing operation, and the like. Furthermore, the imaging device 100 is built with a calculation processing mechanism for processing the image data. The calculation processing mechanism, and the like mounted inside the imaging device 100 will be described below.

2: FUNCTION CONFIGURATION OF IMAGING DEVICE 100

Figure 2:
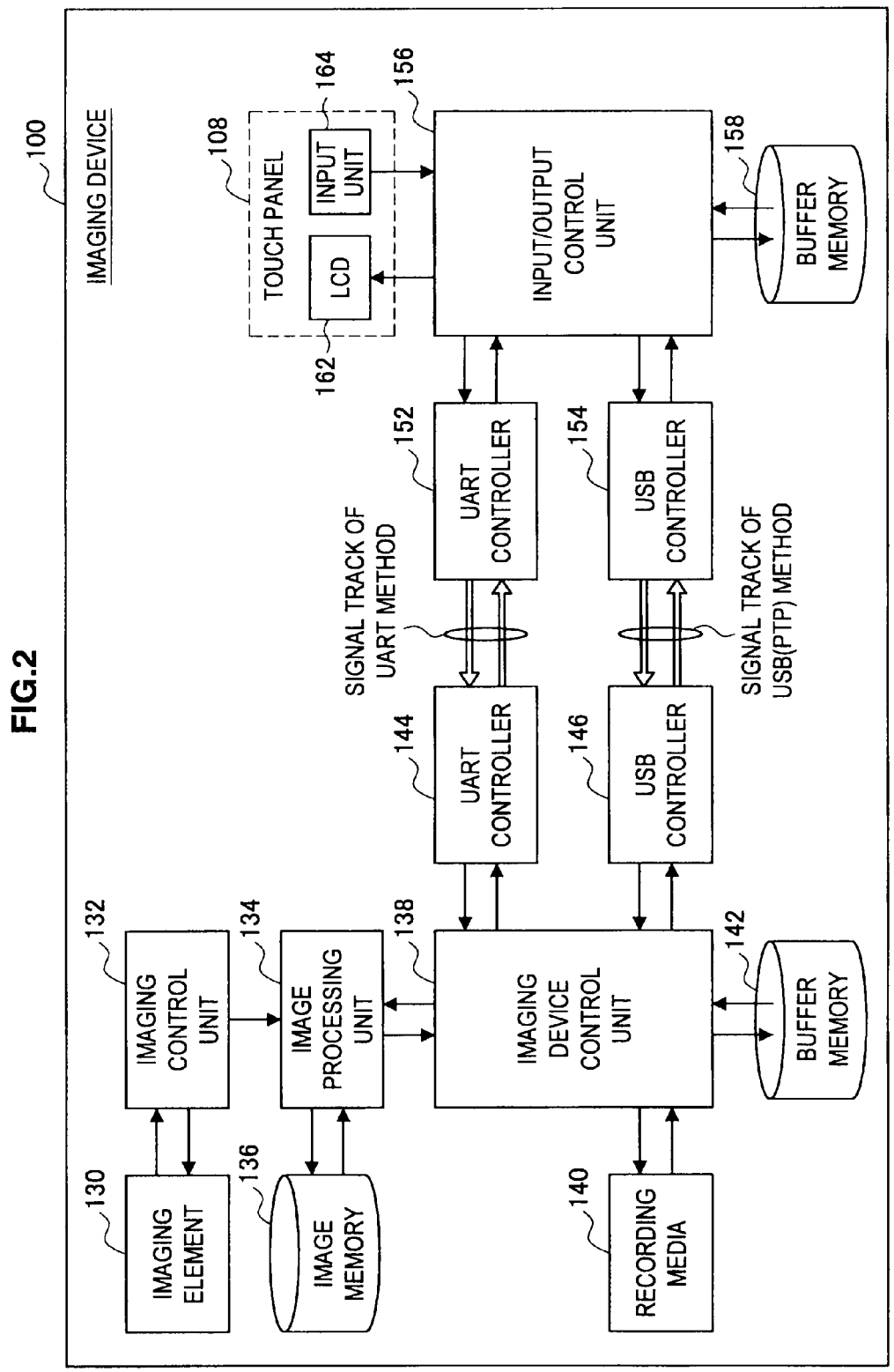
FIG. 2 shows an example of a function configuration of the imaging device according to the embodiment.

First, the function configuration of the imaging device 100 according to the present embodiment will be described first with reference to FIG. 2. FIG. 2 is an explanatory view showing an example of a function configuration of the imaging device 100 according to the present embodiment.

As shown in FIG. 2, the imaging device 100 mainly includes an imaging element 130, an imaging control unit 132, an image processing unit 134, an image memory 136, and an imaging device control unit 138. The imaging device 100 also includes a recording media 140, buffer memories 142, 158, UART controllers 144, 152, USB controllers 146, 154, an input/output control unit 156, and a touch panel 108. The touch panel 108 includes an LCD 162 and an input unit 164. The LCD referred herein is an abbreviation for Liquid Crystal Display. The UART referred herein is an abbreviation of Universal Asynchronous Receiver Transmitter.

First, when the shutter key 106 is pressed, the shutter is released, and the light enters the imaging element 130 through the lens unit 102. The imaging element 130 outputs an electric signal corresponding to the intensity of the incident light. CCD (Charge Coupled Device), CMOS (Complementary Metal Oxide Semiconductor), and the like are used for the imaging element 130. The imaging element 130 is arranged with a plurality of pixel regions, where the intensity of the incident light is detected in the individual pixel region. Thus, the subject image is formed based on the intensity of the electric signal output from each pixel region of the imaging element 130. The electric signal output from the imaging element 130 is input to the imaging control unit 132.

The imaging control unit 132 controls the operation of the lens unit 102, the imaging element 130, and the like, and also digitizes the electric signal input from the imaging element 130 to generate image data. The image data generated by the imaging control unit 132 is input to the image processing unit 134. The image processing unit 134 codes the image data input from the imaging control unit 132 according to a predetermined coding method, or performs compression process on the image data. The predetermined coding method includes GIF, JPEG/JPEG2000, PICT, PING, and the like. In the case of the moving image, the predetermined coding method may be AVI, DV, MPEG, Motion JPEG, and the like. It can be recognized that one or a plurality of methods selected from the above methods or other methods are actually used.

The image processing unit 134 uses the image memory 136 when executing the coding process. For instance, consider the coding process of the image data by the JPEG method. In this case, the image processing unit 134 performs discrete cosine transformation (hereinafter referred to as DCT) on the image data to calculate a DCT coefficient, and performs quantization process and entropy coding process on the DCT coefficient. For instance, the image processing unit 134 holds the original image data in the image memory 136, and calculates the DCT coefficient by reading out each pixel value. The DCT coefficient calculated by the image processing unit 134 is recorded in the image memory 136. The image processing unit 134 then reads out the DCT coefficient from the image memory 136 and quantizes the DCT coefficient, and records the quantized DCT coefficient in the image memory 136. Furthermore, the image processing unit 134 reads out the quantized DCT coefficient from the image memory 136 and performs entropy coding thereon. The image data coded in such manner is input to the imaging device control unit 138.

If, on the other hand, the coded image data is input from the imaging device control unit 138 to the image processing unit 134, the image processing unit 134 decodes the input coded image data. For instance, when the image data coded with the JPEG method is input from the imaging device control unit 138, the image processing unit 134 performs entropy decoding process on the input image data. Furthermore, the image processing unit 134 performs an inverse quantization process on the decoded DCT coefficient, and then executes an inverse discrete cosine transformation (hereinafter referred to as IDCT). Similar to the coding process, the image processing unit 134 uses the image memory 136 in each processing step. The image data decoded by the image processing unit 134 is again input to the imaging device control unit 138. It is to be noted that the decoded image data may not completely match the image data before coding due to influence of quantization error, etc. Obviously, the original image data is completely restored when using other lossless compression methods.

The imaging device control unit 138 records the image data coded by the image processing unit 134 in the recording media 140. When displaying the image data on the touch panel 108, the imaging device control unit 138 reads out the coded image data from the recording media 140, inputs such image data to the image processing unit 134, and decodes the image data. The imaging device control unit 138 then transmits the image data decoded by the image processing unit 134 to the input/output control unit 156, to be hereinafter described, through the USB controllers 146, 154. In this case, the image data decoded by the image processing unit 134 is temporarily recorded in the buffer memory 142.

The imaging device control unit 138 generates a directory stored with the image data when recording the image data in the recording media 140. For instance, the imaging device control unit 138 sequentially stores the image data in a predetermined directory. When a predetermined number of image data are stored in the predetermined directory, the imaging device control unit 138 generates a new directory, and sequentially stores new image data in the new directory. The new directory is sequentially generated in such manner. Thus, a plurality of directors is generated in the recording media 140 as the number of image data increases.

The imaging device control unit 138 also manages the image data based on the imaged date and time, or the attribute given to the image. Furthermore, the imaging device control unit 138 can generate a virtual folder and manage the image data apart from the directory to which the image data are actually stored. In the following description, the above-described directory is sometimes referred to as actual folder, and the virtual folder is sometimes referred to as virtual folder. The virtual folder referred herein means a category that can be arbitrarily set by the user. The virtual folder and the actual folder are common in that both folders group the image data.

For instance, the user generates a virtual folder "favorite", and registers the image data "image 1" in "favorite 1". In this case, the imaging device control unit 138 handles the image data "image 1", which is actually stored in a predetermined actual folder, as if stored in "favorite 1". Actually, however, the address of "image 1" in the recording media 140 is merely corresponded to "favorite 1". Thus, the imaging device control unit 138 manages the image data based on the structure of the actual folder, and manages the image data using the correspondence relationship of the virtual folder and the image data. The information indicating the correspondence relationship is recorded in the recording media 140 by the imaging device control unit 138 at the stage the image data is registered in the virtual folder.

(Regarding Method of Managing Image Data)

Figure 3:
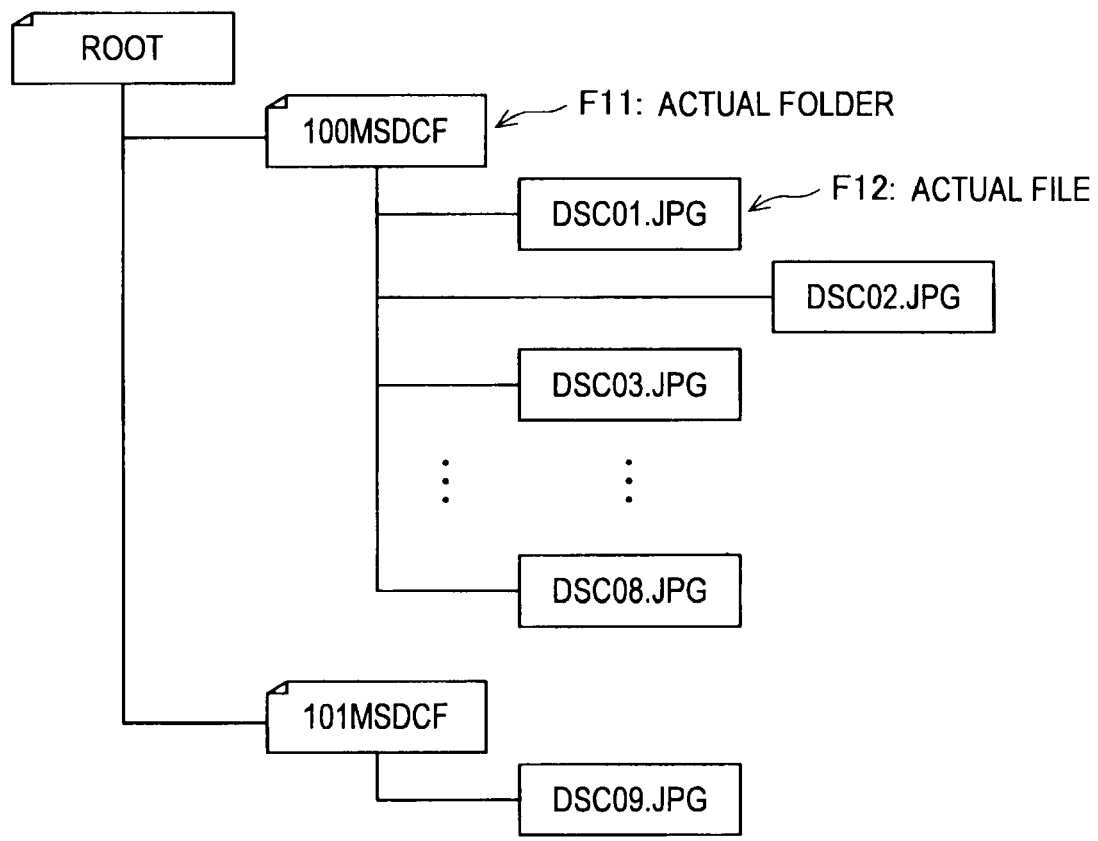
FIG. 3 shows one example of the configuration of a folder according to the embodiment.
Figure 4:
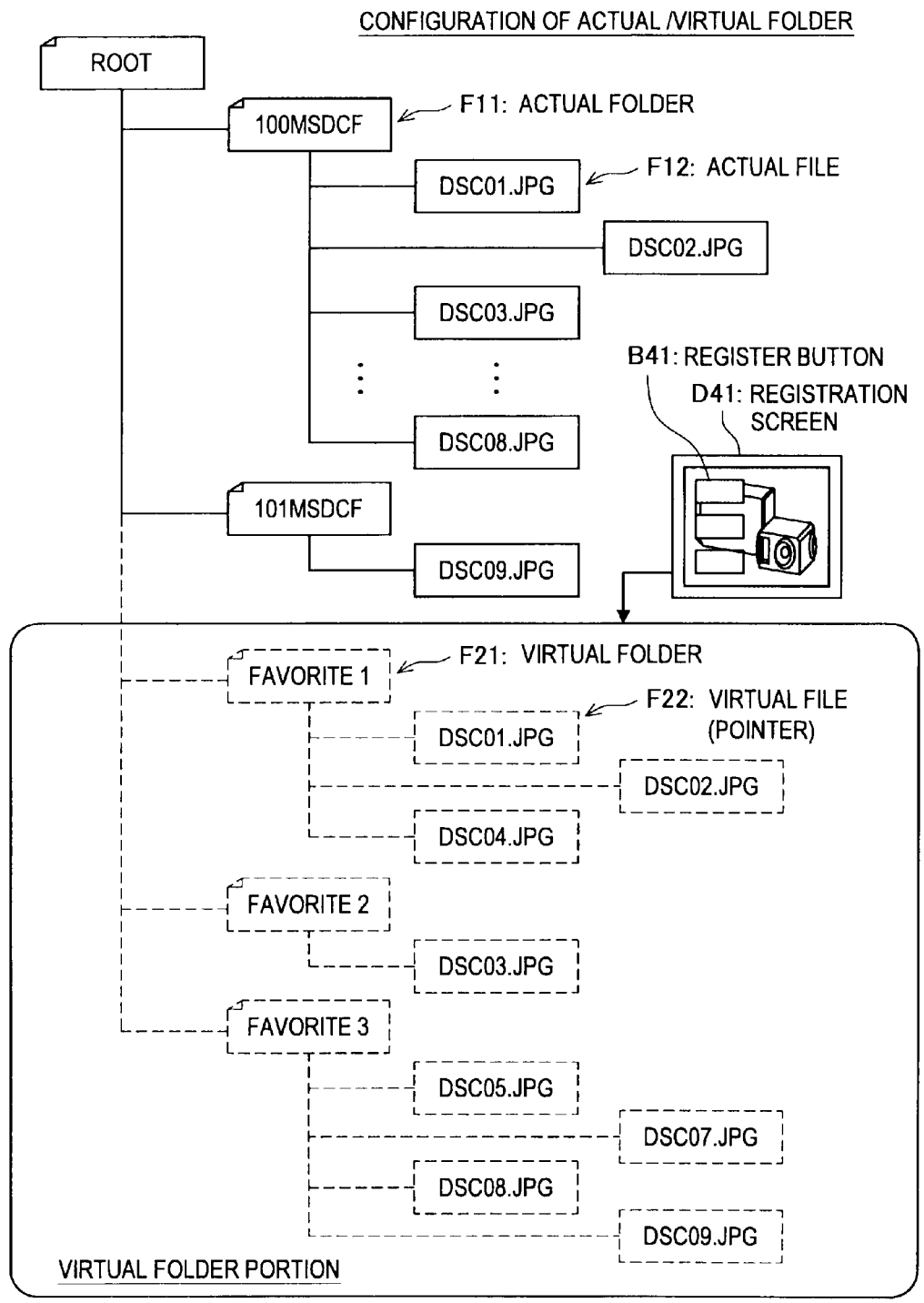
FIG. 4 shows one example of the configuration of a folder according to the embodiment.

The method of managing the image data by the imaging device control unit 138 will be described in detail below using specific examples with reference to FIGS. 3 and 4. FIG. 3 is an explanatory view showing a configuration example of the actual folder. FIG. 4 is an explanatory view showing a folder configuration example of when the virtual folder is generated. The examples of FIGS. 3 and 4 schematically show the folder configuration.

First, FIG. 3 will be referenced. In FIG. 3, two actual folders F11 and nine actual files F12 (partially omitted) are shown by way of example. Specifically, "100MSDCF" and "101MSDCF" are shown for the actual folder F11. "DSC01.JPG" to "DSC09.JPG" are shown for the actual file F12. In the example of FIG. 3, eight actual files F12 are assumed to be stored in one folder. Thus, the ninth actual file F12 ("DSC09.JPG") is not stored in the first actual folder F11 ("100MSDCF"), and is stored in the second actual folder F11 ("101MSDCF").

First, the imaging device control unit 138 stores the image data in the "100MSDCF" in order from "DCF01.JPG", and generates "101MSDCF" at the stage maximum storage number of the actual folder F11 is reached ("DCF08.JPG"). The imaging device control unit 138 stores the "DCF09.JPG" in the newly generated "101MSDCF". The structure of the actual folder as shown in the example of FIG. 3 is formed through the above processes. Furthermore, when the virtual folder F21 is generated by the user, and the actual file F12 is registered, the folder structure as shown in the example of FIG. 4 is formed.

FIG. 4 describes the structure of the virtual folder F21 and the virtual folder formed by the virtual file F22 in addition to the structure of the actual folder shown in FIG. 3. The virtual file F22 is a pointer for specifying the actual file F12. For instance, the virtual file F22 described as "DSC01.JPG" is a pointer for specifying the actual file F12 ("DSC01.JPG"). The virtual file F22 is generated by registering the actual file F12 to the predetermined virtual folder F21. The registration process of the actual filer F12 to the virtual folder F21 is executed in the following manner.

First, a registration screen D41 shown in FIG. 4 is referenced. In the example of FIG. 4, the image data is displayed on the registration screen D41. Furthermore, a register button B41 is displayed on the registration screen D41. For instance, three register buttons B41 displayed as "favorite 1", "favorite 2", and "favorite 3" are displayed on the registration screen D41. Assume the virtual folder F21 corresponding to "favorite 1", "favorite 2", and "favorite 3" is created beforehand by the user. When the register button B41 of "favorite 1" is selected by the user, the image data (e.g., "DSC01.JPG") displayed on the registration screen D41 is registered with respect to the virtual folder F21 of "favorite 1". The user can freely create the virtual folder F21 and register the virtual file F22.

The method of managing the image data by the imaging device control unit 138 has been described above. As described above, the imaging device control unit 138 manages the image data using the virtual folder F21 freely set by the user. Therefore, the image data is managed based on the category freely set by the user independent from the structure of the actual folder F11 automatically generated for every predetermined number. Thus, the user can rapidly find the desired image data even when the number of images is increased as the image data is categorized. Specifically, the categories are presented to the user, so that the user can select the category and rapidly find the desired image data when image data belonging to the selected category are presented.

Figure 5:
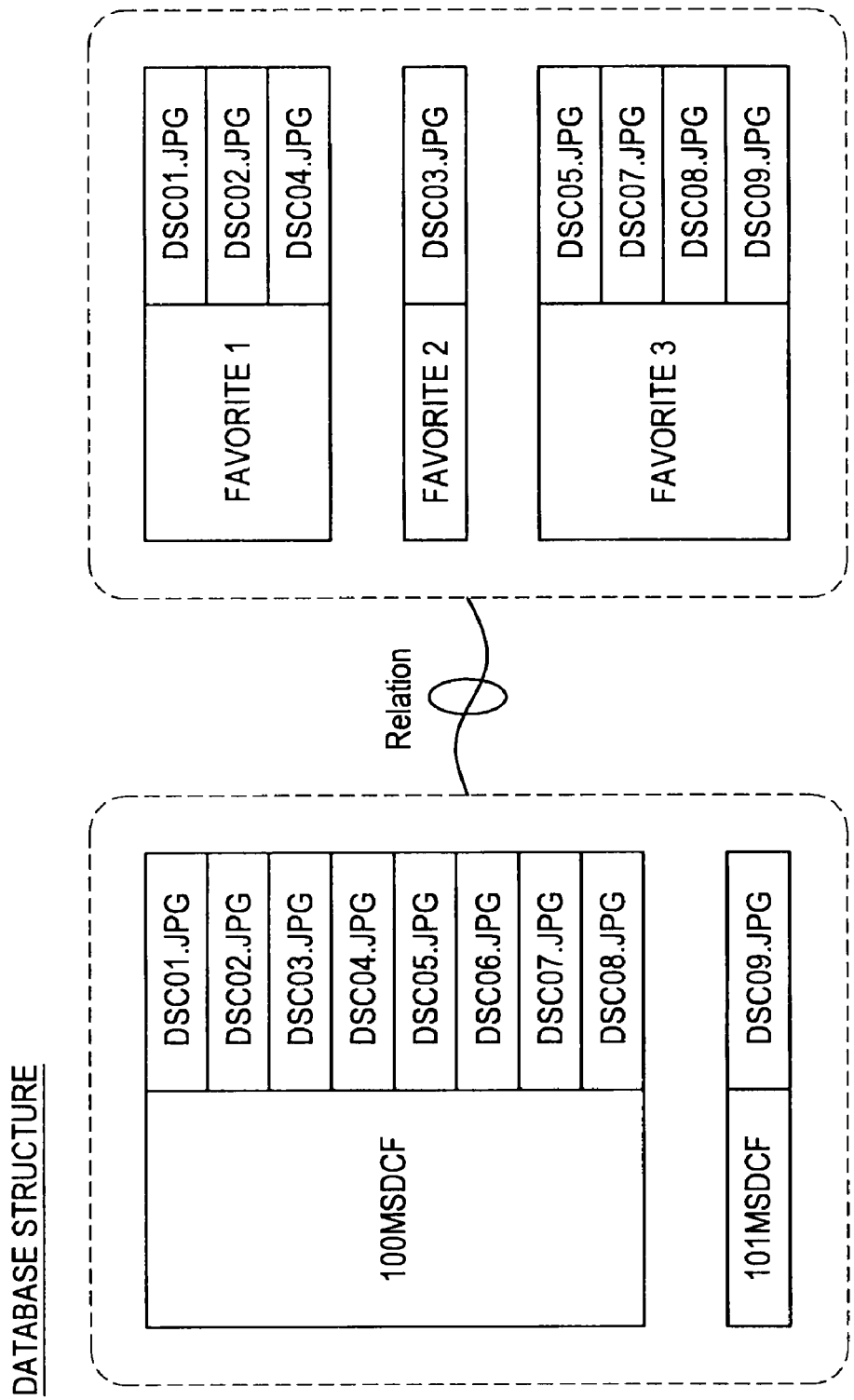
FIG. 5 shows one example of a database structure according to the embodiment.

The folder structure shown in FIG. 4 is managed in the form of database having the structure shown in FIG. 5. That is, the imaging device control unit 138 manages the actual folders, the virtual folders, and the files with the database shown in FIG. 5. For instance, when the power of the imaging device 100 is turned ON, the imaging device control unit 138 builds the database as shown in FIG. 5 based on the information related to the folders and the files recorded in the recording media 140. The imaging device control unit 138 then stores the built database in the buffer memory 142, and appropriately reads out the database from the buffer memory 142 for reference. Such database is preferably built in the form of relational database as shown in FIG. 5 from the standpoint of search process efficiency and management efficiency.

Reference is again made to FIG. 2. As shown in FIG. 2, the imaging device control unit 138 is connected to the UART controller 144 and the USB controller 146. The UART controller 144 is connected to the UART controller 152 by way of a predetermined signal track. Furthermore, the USB controller 146 is connected to the USB controller 154 by way of a predetermined signal track. The signal is transmitted in the UART method (serial transmission method) between the two UART controllers 144, 152. The signal is transmitted between the two USB controllers 146, 154 according to the PTP.

The UART and the PTP will be briefly described below.
(Regarding UART)

The UART is a communication circuit used in serial of PC and the like. More specifically, the UART converts a parallel signal transmitted from a parallel bus of the PC and the like to a serial signal. The UART converts the serial signal transmitted from a peripheral device such as a digital camera and an image scanner to the parallel signal. That is, the UART controller 144 converts the parallel signal input from the imaging device control unit 138 to the serial signal, and transmits the serial signal to the UART controller 152. The UART controller 152 converts the serial signal transmitted from the UART controller 144 to the parallel signal, and inputs the parallel signal to the input/output control unit 156. The inverse procedure in which the signal is transmitted from the UART controller 152 to the UART controller 144 is similar.
(Regarding PTP)

The PTP is a protocol of the data transfer method used in transferring the image data from the digital camera, the image scanner, and the like to the PC etc. When the device designed according to the PTP is used, the user can easily take the image data into the PC without being conscious of the directory structure of the image data. The user can also easily operate the desired image data from the image data transferred to the PC and the like. For instance, the function related to the display of the thumbnail image is defined in the PTP. Through the use of such function, the PC and the like can easily acquire the thumbnail image from the device designed according to the PTP. Thus, the thumbnail image is presented to the user on the standard basis.

However, the PTP does not define the function of transferring the directory structure of the image data. Thus, the directory structure of the image data is difficult for the PC and the like to acquire from the device designed according to the PTP. When using the PTP, an object handling list indicating the list information of all image data stored in the digital camera and the like is to be acquired for the PC and the like to acquire the number for specifying the image data. That is, in acquiring the image data, the PC and the like specifies the number of the image data described in the object handling list and acquires the image data corresponding to the specified number. However, if the number of images held by the digital camera and the like is large, the data size of the object handling list becomes large, and the acquisition process of the object handling list takes a long time.

The object handling list has the configuration shown in FIG. 8. As shown in FIG. 8, the object handling list is described with an object handle number for specifying the individual object, an attribute of the object, and an object name. In addition to the image data, the folder to which the image data are stored is also included as the object. In the field of the attribute, the information indicating whether the object is a file or whether the object is a folder is described. Therefore, the number of image data described in the object handling list increases in proportion to the number of image data stored in the recording media 140, and the amount of data of the object handling list increases. In a typical PTP framework, information of the virtual folder is not described in the object handling list even if the virtual folder is set.

As briefly described above, various methods that can enhance the convenience of the user when transmitting the image data are obtained by using the PTP. On the contrary, demerits arise when the number of image data becomes large such as the acquisition of the object handling list takes time, and the time for acquiring the image data becomes long. The UART relates to a method of serializing the signal track and transmitting the signal. Here, the data transmitted between two UART controllers 144, 152 is not given a special limitation such as the PTP.

Thus, two types of signal tracks are arranged in the imaging device 100. The technical features of the present embodiment lie in that the signal track (PTP) on which the image data is transmitted and another signal track (UART) are combined to efficiently transmit the information related to the image data. That is, arranging two UART controllers 144, 152 and forming another signal track in addition to the signal track formed between the two USB controllers 146, 154 is one technical feature in the configuration of the imaging device 100. The content and the transmission timing of the data transmitted through such signal tracks will be hereinafter described in detail.

As described above, the serial signal transmitted to the UART controller 152 is converted to the parallel signal and input to the input/output control unit 156. The image data and the like transmitted to the USB controller 154 are also input to the input/output control unit 156. The input/output control unit 156 displays the image data acquired from the imaging device control unit 138 through the two USB controllers 146, 154 on the LCD 162. The input/output control unit 156 acquires the image data or information of the image from the imaging device control unit 138 based on the operation information input from the input portion 164. Furthermore, the input/output control unit 156 displays the image data or the information of the image data acquired from the imaging device 138 on the LCD 162.

The input/output control unit 156 temporarily records the image data or the information of the image data acquired from the imaging device 138 in the buffer memory 158. The input/output control unit 156 reads out the image data or the information of the image data temporarily recorded in the buffer memory 158 and displays the same on the LCD 162. The input/output control unit 156 may have a function of communication with the device exterior to the imaging device 100. For instance, the input/output control unit 156 may be mounted with the function of wirelessly or wired communicating with the external device, and may distribute the image data or the information of the image data to the external device. The input/output control unit 156 may acquire arbitrary data from the external device using the communication function, and display the acquired data on the LCD 162.

As described above, the imaging device 100 is mounted with the imaging device control unit 138 and the input/output control unit 156. That is, the imaging device 100 is mounted with two calculation processing chips. As described above, the imaging device control unit 138 is mainly used in the control of the imaging device, and executes calculation processing related to the acquisition of the image data. The input/output control unit 156 executes display control and calculation processing related to the management of the input information. An advantage in that the imaging device 100 is easily mounted with a variety of functions can be achieved by separating the process related to photographing and other processes. One example of which is the communication function.

If such function is mounted, the user can perform Web browsing using the touch panel 108 arranged in the imaging device 100 or upload the image data directly to the server from the imaging device 100. In addition, the image data can be released to other servers and clients present on the network. Thus, when mounting an additional function different from the imaging function originally provided to the imaging device 100, implementing the additional function with respect to the calculation processing chip for controlling the imaging function is not preferable from the standpoint of design load, manufacturing cost, and the like. That is, the imaging device 100 is inevitably mounted with two calculation processing chips.

The issue thus arises regarding the mechanism for connecting the two calculation processing chips. In the present embodiment, the serial signal track using the UART and the signal track using the USB are adopted for such mechanism.

The transmission of at least the image data is desired for such mechanism, as it connects the two calculation processing chips in the imaging device 100. From such reason, the two calculation processing chips are connected with the USB and the image data and the information of the image data are transmitted according to the PTP. However, when using the PTP, the acquisition process of the object handling list is desired every time the image data or the information of the image data are acquired, which is very inefficient.

The PTP is originally a standard established in view of the data transmission process between the PC and the peripheral device. The PC is mounted with a high-speed calculation processing chip, and can process at high speed even if the amount of data of the object handling list is large. The processes related to the display of the image data, and the like are all executed on the PC. Thus, even if the PC acquires the list of all image data held by the peripheral device as the object handling list when the PC and the peripheral device are connected, and the PC analyzes such list to acquire the image data, the issue of processing time barely arises. The calculation capacity of the calculation processing chip mounted on the imaging device 100 is relatively low. Thus, the issue related to the processing time easily arises.

In particular, the delay of screen transition that occurs from the transfer time of the object handling list leads to lowering of operability, and gives a great uncomfortable feeling to the user. Thus, in the present embodiment, the data transmission method between the imaging device control unit 138 and the input/output control unit 156 is devised to propose a technique of avoiding the delay of screen transition by using the signal track of the UART method and the signal track of the USB method in combination. The data transmission method and the display control method according to the present embodiment will be specifically described below using specific examples by way of example.

3: DISPLAY CONTROL METHOD OF IMAGE SELECTION SCREEN

The display control method of the image selection screen will be described first with reference to FIG. 6. The delay of the screen transition that occurs from the transfer time of the object handling list easily occurs in the transition scene of the selection screen related to the selecting operation of the image data. The data transmission method and the display control method according to the present embodiment will be specifically described using the transition scene of the selection screen used in the selection of the reproducing image by way of example. FIG. 6 is an explanatory view showing the display control method of the image selection screen.

The folder and the file shown in FIG. 4 are assumed to be recorded in the recording media 140. Each display screen is displayed on the touch panel 108 (LCD 162). The display process of each display screen is executed by the input/output control unit 156.

First, when the reproduce key 104 of the imaging device 100 is pressed, a category selection screen D1 is displayed on the screen. The category selection screen D1 is displayed with an actual folder select button B11 and a virtual folder select button B12 (S1). In this case, the input/output control unit 156 holds information related to the presence of the actual folder F11 and the presence of the virtual folder F21. If the virtual folder F21 is not present, the virtual folder select button B12 may not be displayed on the category selection screen D1. The user presses the actual folder select button B11 or the virtual folder select button B12. In the description, the expression "press" the button is used, but it can be recognized that this actually sometimes means the contacting operation with respect to the touch panel 108.

(When "Favorite" is Selected)

For instance, when the virtual folder select button B12 is pressed, the input/output control unit 156 transitions the screen display to the virtual folder selection screen D21 (S2). The virtual folder selection screen D21 is displayed with the virtual folder select button B21 for selecting "favorite 1", "favorite 2", and "favorite 3" registered as the virtual folder F21. In this case, the input/output control unit 156 acquires the number of virtual folders F21 recorded in the recording media 140, and displays the virtual folder select button B21 by such number.

In the framework of the PTP, the object handling list is to be required to acquire the number of virtual folders F21. In particular, in the framework of the prior and existing PTP, the acquisition of the object handling list related to all image data stored in the recording media 140 is desired. Thus, when attempting to realize the screen transition from the category selection screen D1 to the virtual folder selection screen D21 in the framework of the prior and existing PTP, such screen transition tends to greatly delay. Thus, in the present embodiment, a method of avoiding such delay is proposed. This method will be described in detail in the post-stage with reference to FIG. 7.

When one virtual folder select button B21 ("favorite 1") is pressed on the virtual folder selection screen D21, the input/output control unit 156 transitions the screen display to the image selection screen D31 (S3). The image selection screen D31 is displayed with image select buttons B31 corresponding to "image 1", "image 2", and "image 4" registered in the "favorite 1". In this case, the input/output control unit 156 recognizes the number of actual files F12 corresponded to each virtual folder F21. For instance, the input/output control unit 156 grasps the number of actual files F12 corresponded to each virtual folder F21 at the time point the virtual folder select button B21 is pressed on the virtual folder selection screen D21.

The input/output control unit 156 acquires the thumbnail image to be displayed on the image selection screen D31 using the PTP command. The input/output control unit 156 may not acquire the thumbnail images of all the actual files F12 at the same time. For instance, the input/output control unit 156 acquires the thumbnail image corresponding to the actual file F12 of the virtual folder F21 selected in the virtual folder selection screen D21, and displays the acquired thumbnail image as the image select button B31 on the image selection screen D31.

The input/output control unit 156 may be configured to acquire the thumbnail image corresponding to the actual file F12 of the next virtual folder F21 when the number of actual files F12 of the virtual folder F21 selected in the virtual folder selection screen D21 is smaller than a predetermined number. The predetermined number is set as the number of the image select buttons B31 that can be displayed on the image selection screen D31. According to such configuration, the thumbnail image corresponding to the actual file F12 is sequentially acquired for every virtual folder F21 according to the displayable number of image select buttons B31.

Figure 6:
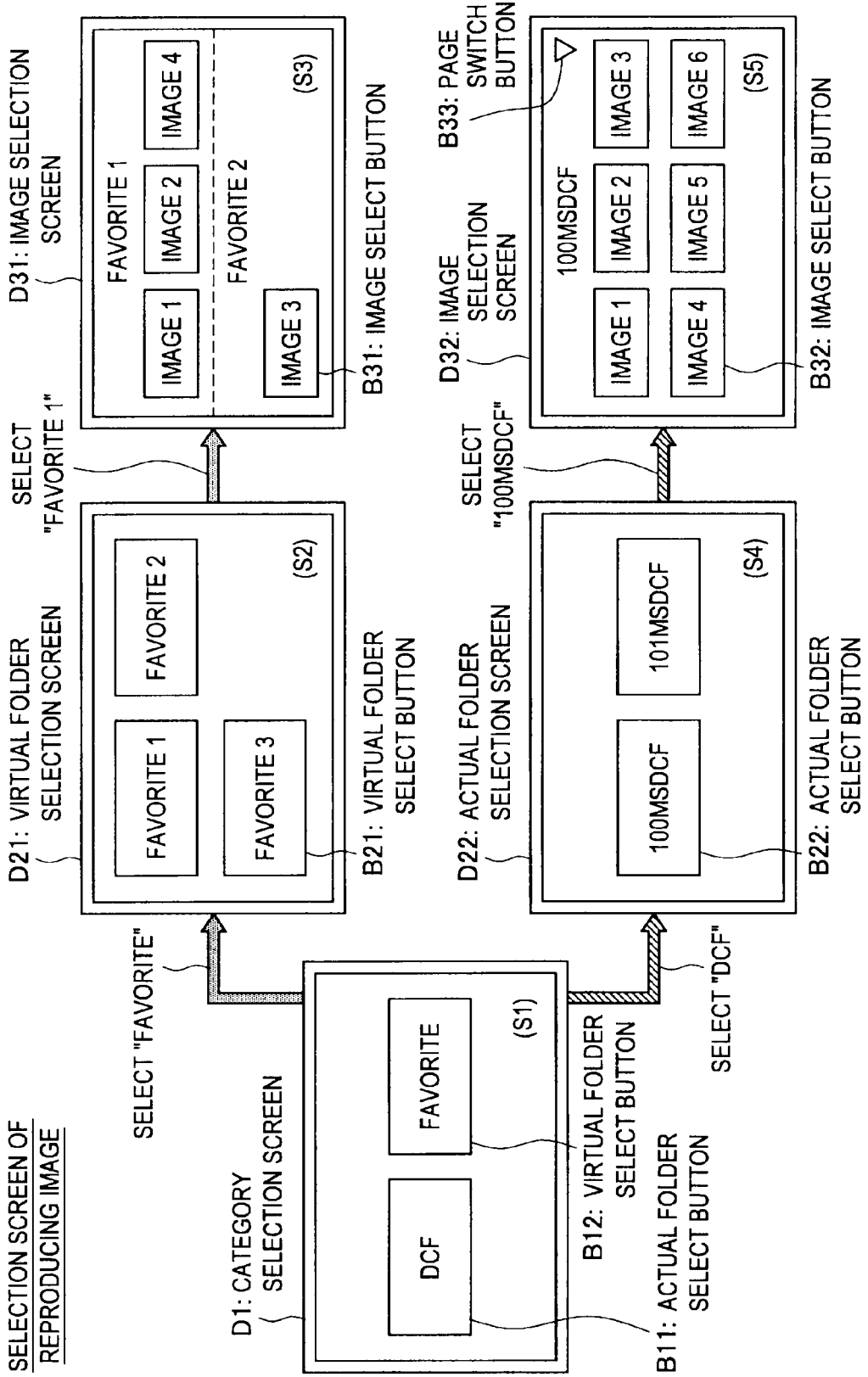
FIG. 6 shows a transition process of an image selection screen according to the embodiment.
Figure 7:
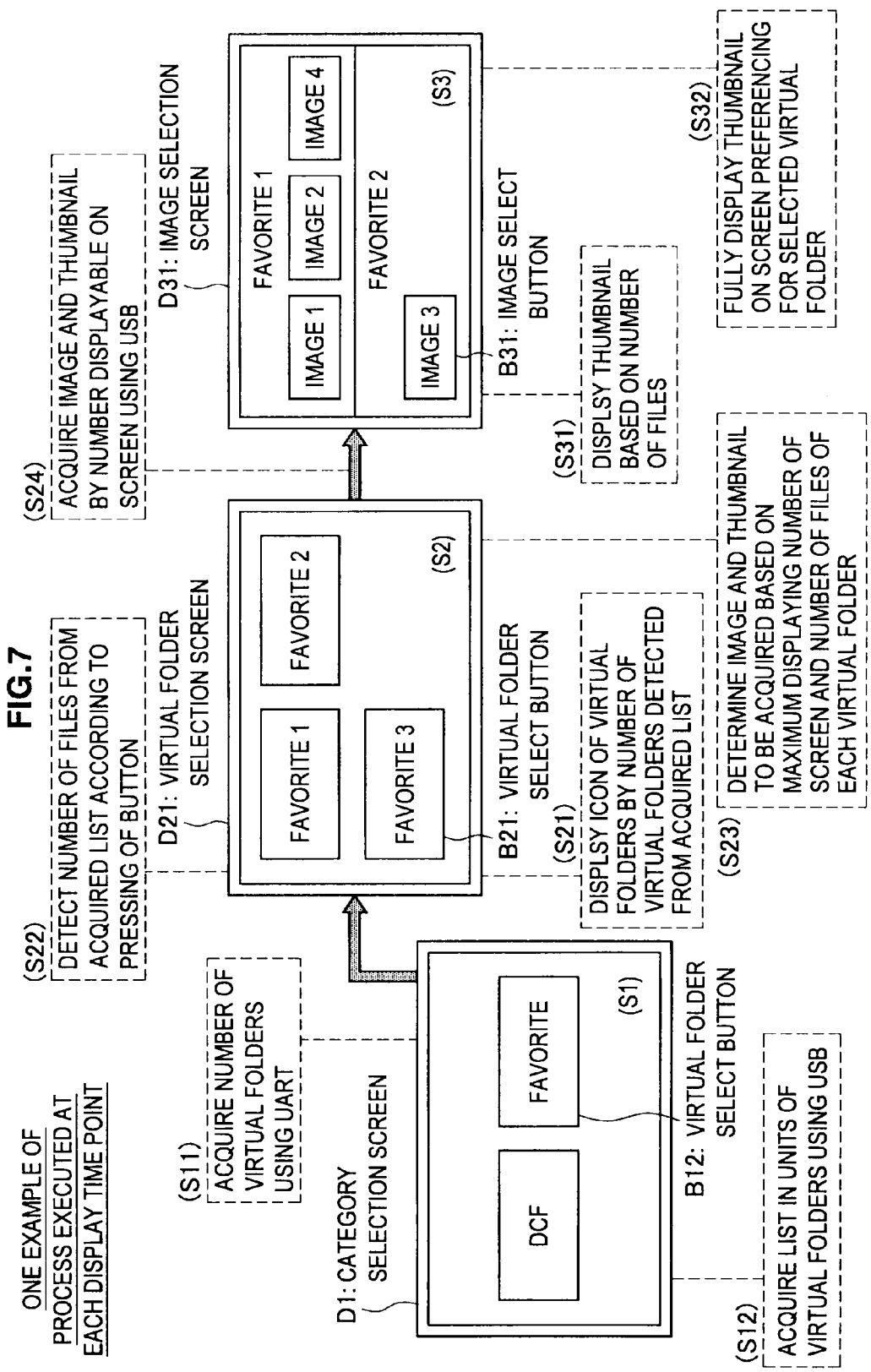
FIG. 7 shows a transition process of an image selection screen according to the embodiment.

As shown in FIG. 6, when displaying the image select button B31 corresponding to a plurality of virtual folders F21, the image select button B31 is displayed such that each virtual folder F21 can be distinguished. According to such display, the user can easily find and select the desired image data. When the image select button B31 is selected in the image selection screen D31, the image data corresponding to such image select button B31 is displayed on the screen.

(When "DCF" is Selected)

When the actual folder select button B11 is pressed on the category selection screen D1, the input/output control unit 156 transitions the screen display to the actual folder selection screen D22 (S4). The actual folder selection screen D22 is displayed with an actual folder select button B22 corresponding to "100MSDCF", "101MSDCF" registered as the actual folder F11. In this case, the input/output control unit 156 acquires the number of actual folders F11 recorded in the recording media 140, and displays the actual folder select button B22 by such number.

However, in the framework of the PTP, the object handling list is to be acquired to acquire the number of actual folders F11. In particular, in the framework of the prior and existing PTP, the acquisition of the object handling list related to all image data stored in the recording media 140 is desired. Thus, when attempting to realize the screen transition from the category selection screen D1 to the actual folder selection screen D22 in the framework of the prior and existing PTP, such screen transition tends to greatly delay. A method of avoiding such delay is thus proposed in the present embodiment. This method will be specifically described with reference to FIG. 7 in the post-stage.

When one actual folder select button B22 ("100MSDCF") is pressed on the actual folder selection screen D22, the input/output control unit 156 transitions the screen display to the image selection screen D32 (S5). The image select buttons B32 to select "image 1", "image 2", "image 3", "image 4", "image 5", or "image 6" stored in the "100MSDCF" is displayed on the image selection screen D32. In this case, the input/output control unit 156 recognizes the number of actual files F12 stored in each actual folder F11. For instance, the input/output control unit 156 grasps the number of actual files F12 stored in each actual folder F11 at the stage that the actual folder select button B22 is pressed on the actual folder selection screen D22.

As shown in FIG. 4, the number of actual files F12 stored in "100MSDCF" is eight in the example of FIG. 6. In the example, the number of image select buttons B32 that can be displayed on the screen (hereinafter referred to as displayable number) is limited to six. Thus, the image select buttons B32 corresponding to all actual files F12 stored in "100MSDCF" are not displayed on the image selection screen D32. A page switch button B33 is displayed on the image selection screen D32. The page switch button B33 is displayed when the number of actual files F12 in the actual folder F11 selected in the actual folder selection screen D22 is greater than the displayable number. When the page switch button B33 is pressed, the image select buttons B32 corresponding to the remaining actual files F12 are displayed. When the image select button B32 is pressed, the image data corresponding to such image select button B32 is displayed on the screen.

The input/output control unit 156 acquires the thumbnail image to be displayed on the image selection screen D32 using the PTP command. The input/output control unit 156 may not acquire the thumbnail images of all the actual files F12 at the same time. For instance, the input/output control unit 156 acquires the thumbnail image corresponding to the actual file F12 of the actual folder F11 selected on the actual folder selection screen D22, and displays the acquired thumbnail image as the image select button B32 of the image selection screen D32.

The input/output control unit 156 may be configured to acquire the thumbnail image corresponding to the actual file F12 of the next actual folder F11 when the number of actual files F12 of the actual folder F11 selected in the actual folder selection screen D22 is smaller than a predetermined number. The predetermined number is set as the number of the image select buttons B32 that can be displayed on the image selection screen D32. According to such configuration, the thumbnail image corresponding to the actual file F12 is sequentially acquired for every actual folder F11 according to the displayable number of image select buttons B32.

The display control method by the input/output control unit 156 and the transition of the image selection screen have been described above. The data transmission method between the imaging device control unit 138 and the input/output control unit 156 executed according to the timing of screen transition or the operation timing of various types of buttons will be described with reference to FIG. 7. FIG. 7 is an explanatory view showing the content of data transmission process executed at each display point. In the example of FIG. 7, only a case in which the virtual folder select button B12 is pressed on the category selection screen D1 is shown, but similar process is executed for a case in which the actual folder select button B11 is selected.

(Details of Data Transmission Process)

First, when the virtual folder select button B12 is pressed on the category selection screen D1, the input/output control unit 156 acquires the presence of the actual folder F11 and the presence of the virtual folder F21 exists through the signal track of the UART method. If both the actual folder F11 and the virtual folder F21 exist, the actual folder select button B11 and the virtual folder select button B12 are displayed on the category selection screen D1 as shown in FIG. 7. When the virtual folder select button B12 is pressed on the category selection screen D1, the input/output control unit 156 requests the imaging device control unit 138 to create an object handling list related to the virtual folder F21 (S11). The request of creating the object handling list is transmitted through the signal track of UART method.

(Regarding Configuration of Object Handling List)

The configuration of the object handling list created by the imaging device control unit 138 will be described with reference to FIGS. 8 to 10. FIG. 8 is an explanatory view showing an example of the configuration of the object handling list related to the actual folder F11. FIG. 9 is an explanatory view showing an example of the configuration of the object handling list containing the information of the actual folder F11 and the virtual folder F21. FIG. 10 is an explanatory view showing an example of the configuration of object handling list related only to the virtual folder F21.

The configuration of the object handling list shown in FIG. 8 has been briefly described. However, in the above description, the object handling list in FIG. 8 is treated as one example of general object handling list. In general, even though the virtual folder F21 is registered, the content of the object handling list is related only to the actual folder F11 as shown in FIG. 8. Thus, the information related to the virtual folder F21 is not contained. If the information related to the virtual folder F21 is to be contained in the object handling list by expanding the framework of the PTP, the object handling list will be as shown in FIG. 9.

The object handling list of FIG. 9 contains the portion related to the actual folder F11 and the portion related to the virtual folder F21. The portion related to the actual folder F11 is substantially the same as the object handling list shown in FIG. 8. However, the portion related to the virtual folder F21 is described with the virtual folder F21 as the object. Furthermore, the actual file F12 registered in the virtual folder F21 is described in the object handling list of FIG. 9. It is to be noted that "the actual file F12 registered in the virtual folder F21 is already described in the object handling list as the actual file F12 stored in the actual folder F11". That is, if the concept of the object is extended to the virtual folder F21, the size of the object handling list has a possibility of becoming significantly large.

For instance, "favorite 1" is registered with "DSC01.JPG", "DSC02.JPG"', "DSC04.JPG". However, "DSC01.JPG", "DSC02.JPG", "DSC04.JPG" are described in the portion related to the actual folder F11 as the file stored in "100MSDCF". The "DSC01.JPG" and the like described in the actual folder portion and the "DSC01.JPG" and the like described in the virtual folder portion are denoted with different object handle number. Thus, if the information related to the virtual folder F21 is contained, redundant information is independently described in the object handling list, and the amount of data increases by such amount. In the example of FIG. 9, the actual folder portion is 12 lines including "ROOT", whereas the virtual folder portion is 11 lines, and thus the data amount is about two times.

As described above, in handling the categorized image data, the information related to the virtual folder F21 is assumed to be used in view of the convenience of the user. If the information related to the virtual folder F21 is to be used by extending the current PTP framework, the configuration of the object handling list as shown in FIG. 9 is necessary. However, the object handling list shown in FIG. 9 leads to delay of the screen transition because of the large amount of data as described above. If prior and existing object handling list in FIG. 8 is used, the information related to the virtual folder F21 may not be used. The present embodiment proposes the technique of creating and utilizing the object handling list containing only the information of the virtual folder portion shown in FIG. 10.

The method of extracting and transmitting part of the object handling list is not defined in the framework of the PTP. The PTP is originally defined assuming that the object handling list as shown in FIG. 8 is automatically created from the information of the image data stored in the recording medium 140. Therefore, a mechanism of transferring information such as what kind of object handling list to generate is not provided in the PTP. That is, generating the object handling list shown in FIG. 10 in the process of data transmission process carried out between two USB controllers 146, 154 is difficult.

In order to solve the above difficulty, the imaging device 100 is configured to specify the configuration of the object handling list using the signal track of the UART method, and to create the object handling list in which the imaging device control unit 138 is specified. The object handling list created by the imaging device control unit 138 is transmitted to the input/output control unit 156 according to the framework of the PTP. Therefore, the amount of data of the object handling list can be reduced while maximally using the mechanism of the PTP. Creation timing of the object handling list and data transmission timing will be described with reference again to FIG. 7.

Reference is again made to FIG. 7. When the virtual folder select button B12 is pressed on the category selection screen D1, the creation request of the object handling list (FIG. 10) corresponding to the virtual folder in FIG. 9 is transmitted to the imaging device control unit 138 (S11). The imaging device control unit 138 that received the creation request of the object handling list creates the object handling list having the configuration specified in the creation request. The imaging device control unit 138 notifies the input/output control unit 156 that the creation of the object handling list is completed. The input/output control unit 156 that received the notification acquires the object handling list related to the virtual folder F21 by using a command for acquiring the object handling list of the PTP (S12). In this case, the input/output control unit 156 acquires the object handling list through the signal track of the USB method.

The case where the actual folder select button B11 is pressed on the category selection screen D1 is similar. First, the creation request the object handling list (FIG. 8) corresponding to the actual folder portion in FIG. 9 is transmitted to the imaging device control unit 138. The imaging device control unit 138 that received the creation request of the object handling list creates the object handling list having the configuration specified in the creation request. The imaging device control unit 138 notifies the input/output control unit 156 that the creation of the object handling list is completed. The input/output control unit 156 acquires the object handling list related to the actual folder F11 using the command for acquiring the object handling list of the PTP. Thus, the object handling list in FIG. 8 is created after receiving the request, and it is to be noted that the generation process differs from general object handling list.

When the object handling list related to the virtual folder F21 is acquired, the virtual folder selection screen D21 is displayed by the input/output control unit 156. First, the input/output control unit 156 analyzes the object handling list acquired from the imaging device control unit 138 and detects the number of virtual folders F21. The input/output control unit 156 then displays the virtual folder select button B21 (icon) for selecting the virtual folder F21 by the detected number of virtual folders F21 (S21). As described above, since the amount of data of the object handling list to be acquired is reduced, the acquisition time of the object handling list is shortened. Furthermore, the calculation load and the processing time for the analyzing process of the input/output control unit 156 are reduced by the reduction in size (number of items) of the object handling list. As a result, the transition time from the category selection screen D1 to the virtual folder selection screen D21 is greatly shortened.

When the virtual folder select button B21 is pressed on the virtual folder selection screen D21, the input/output control unit 156 analyzes the object handling list, and detects the number of actual folders F12 registered in each virtual folder F21 (S22). After the number of actual folders F12 registered in each virtual folder F21 is detected, the input/output control unit 156 determines the thumbnail to acquire from the imaging device control unit 138, based on the displayable number of the image select button B31 in the image selection screen D31 (S23). When acquiring the image data before displaying the image selection screen D31, the input/output control unit 156 also determines the image to acquire from the imaging device control unit 138.

For instance, assume the virtual select button B21 of "favorite 1" is pressed. In this case, the input/output control unit 156 detects the number (three) of actual files F12 registered in "favorite 1". Since the number of image select buttons B31 displayable on the image selection screen D31 is six, a blank region tends to be greatly included in the image selection screen D31 with only the image select button B31 corresponding to "favorite 1". Therefore, the input/output control unit 156 detects the number (one) of actual folder F12 registered in "favorite 2". The image selection screen D31 can be approximately filled by adding the number of actual files F12 registered in "favorite 1" and the number of actual files F12 registered in "favorite 2". If a blank region is greatly included in the image selection screen D31, similar process is executed on "favorite 3".

Thus, the blank region included in the image selection screen D31 can be reduced by displaying the image select button B31 corresponding to "favorite 2", and the like. The type and number of the image select buttons B31 to display on the image selection screen D31 can be determined in the above manner. That is, the image data and the thumbnail image to be acquired from the imaging device control unit 138 are determined. The input/output control unit 156 then acquires all actual files F12 registered in "favorite 1" and "favorite 2" and the thumbnail image corresponding to each actual file F12 from the imaging device control unit 138 through the signal track of the USB method (S24). If the actual files F12 greater in number than the displayable number is registered in "favorite 1", the input/output control unit 156 acquires the actual file F12 and the thumbnail image by the displayable number.

When acquiring the actual file F12 and the thumbnail image from the imaging device control unit 138, the input/output control unit 156 displays the image select button B31 on the LCD 162 for "favorite 1" and "favorite 2" (S31). In this case, the input/output control unit 156 displays the image select button B31 based on the number of actual files F12 registered in "favorite 1" and "favorite 2", respectively. The input/output control unit 156 also displays the thumbnail acquired from the imaging device control unit 138 as each image select button B31. Since the number of thumbnails to be displayed (number of image select buttons B31) is determined so that great amount of blank region is not included in the image selection screen D31 as described above, the thumbnail image is displayed on the image selection screen D31 without waste. The "favorite 1" selected in the virtual folder selection screen D21 is preferentially displayed (S32). For instance, "favorite 1" is displayed at high order in the order of high priority.

The data transmission method between the imaging device control unit 138 and the input/output control unit 156 has been described above along the transition process of the image selection screen. The data transmission method between the imaging device control unit 138 and the input/output control unit 156 has been described above along the transition process of the image selection screen. In the present embodiment, the configuration of the object handling list is transmitted through the signal track of the UART method, and the object handling list having such configuration is created. The created object handling list is transmitted through the signal track of the UART method, and information such as the number of categories is grasped based on the object handling list. As a result, the time related to the transmission is shortened by the reduction in the amount of data of the object handling list to be transmitted, and the speed of screen transition related to category and image selection can be significantly increased.

(Regarding Configuration of Image Data Acquiring Frame)

In relation to the method of acquiring the image data, the configuration of the image data acquiring frame will be described with reference to FIG. 10. FIG. 10 is an explanatory view showing a configuration example of the image data acquiring frame. The image data acquiring frame shown in FIG. 10 is transmitted from the input/output control unit 156 to the imaging device 138 through the signal track of USB method when the image select button B31 is pressed on the image selection screen D31.

Figure 11:
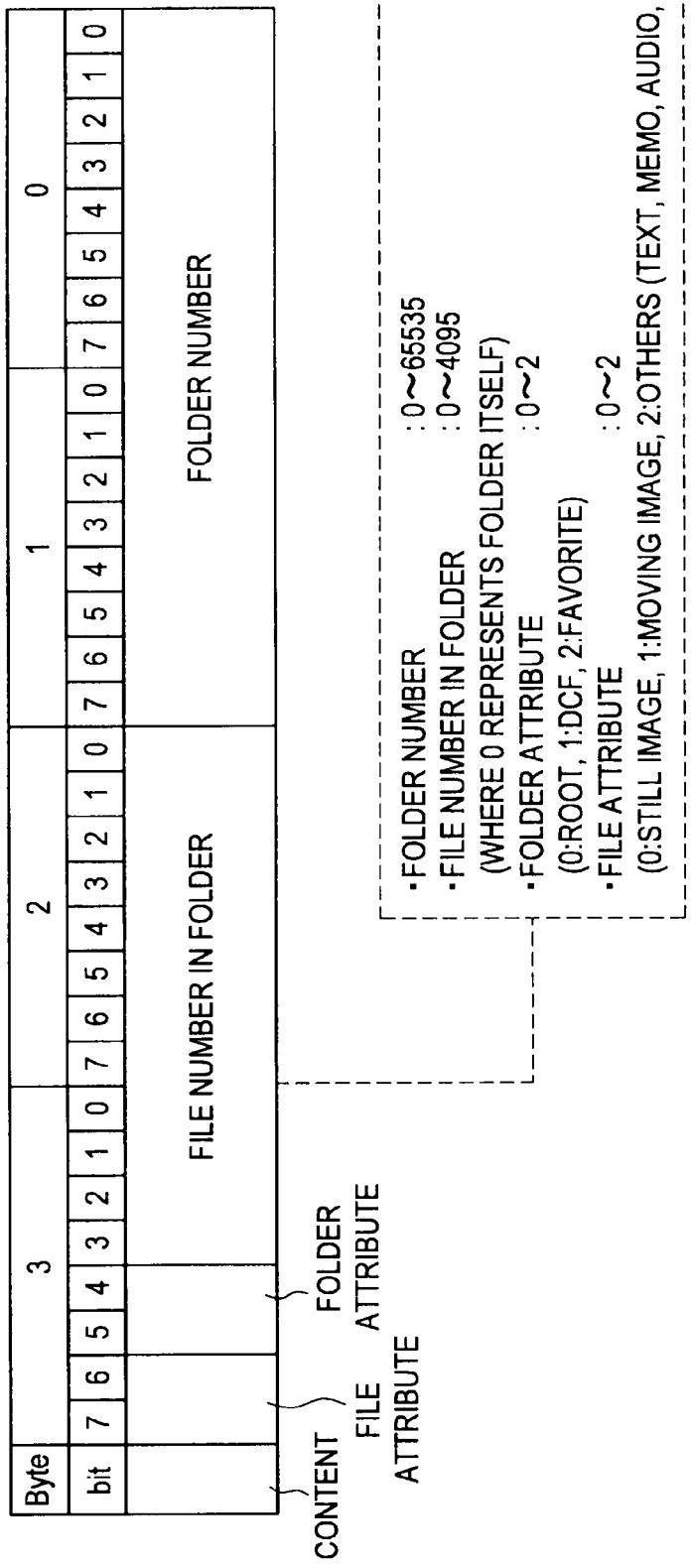
FIG. 11 shows one example of the control process related to a data transmission method of the embodiment.

As shown in FIG. 11, the image data acquiring frame contains a folder number, a file number in the folder, a folder attribute, and a file attribute.

The folder number contained in the image data acquiring frame is an identification number used to specify each folder. The file number in the folder is an identification number used to specify the file in the folder indicated by the folder number. For instance, when the folder number is 1 and the file number is 4, the fourth file is specified of the files registered in the folder of the folder number 1. The file number 0 indicates the folder. Thus, the search range of the file is limited to a specific folder by specifying both the folder number and the file number, and the speed of the search process of the file is increased. Since the virtual folder F21 can be specified with the folder number, and thus the virtual folder F21 can be handled same as the actual folder F11.

The folder attribute contained in the image data acquiring frame is the identification information for specifying the attribute of the folder. For instance, the folder having the folder attribute 0 is "ROOT". The folder having the folder attribute 1 is "DCF". The folder having the folder attribute 2 is "favorite". That is, whether the folder specified with the folder number is ROOT, actual folder F11, or virtual folder F21 is identified based on the folder attribute. Thus, when searching for the folder specified with the folder number by specifying the attribute of the folder, the search target is narrowed to the folder having the specified attribute.

As shown in FIG. 9, the object handle number denoted with "01" for the first two digits is assigned to the object of the actual folder portion. The object handle number denoted with "02" for the first two digits is assigned to the object of the virtual folder portion. Therefore, when the virtual folder F21 ("favorite") is specified with the folder attribute, the specified folder is searched from the objects having "02" for the first two digits of the object handle number. Thus, in the example of FIG. 9, the search target of the specified folder is narrowed to about half. As a result, the time for searching the folder specified with the folder number is greatly reduced. The folder attribute may be set so as to be specified in finer units. For instance, "favorite 1" and "favorite 2" may be set to have different folder attributes.

The file attribute contained in the image data acquiring frame is the identification information for identifying the attribute of the file specified with the folder number and the file number. For instance, the file having the file attribute 0 is "still image" file. The file having the file attribute 1 is "moving image" file. The file having file attribute 2 is "others (text, memo, audio, etc.)" file. That is, the attribute of the file specified with the folder number and the file number is identified by referencing the file attribute.

In the above description, the image data has been described as an example of the transmission target, but the application range of the technique according to the present embodiment is not limited thereto. For instance, character information, audio data, etc. may be recorded in the recording media 140. In such case as well, the input/output control unit 156 can acquire the data from the imaging device control unit 138 through the data transmission method similar to above. In this case, the file attribute contained in the image data acquiring frame is used. When the "moving image" is specified for the file attribute, the search range of the file specified with the file number is limited to "moving image". As a result, the number of search objects reduces, and the speed of the search process increases. The file attribute is distinguished based on the extension etc. given to each file. Specifically, the file of the search target is narrowed down with the extension corresponding to the file attribute described in the image data acquiring frame, and the file adapted to the folder number is extracted therefrom.

The display method of the image selection screen has been described above with the function configuration of the imaging device 100. As described above, the technique of the present embodiment relates to a method of connecting two calculation processing chips arranged in the imaging device 100 with the signal track of the USB method and the signal track of the UART method, and efficiently transmitting data by combining both signal tracks. In particular, the characteristics lies in the configuration that reduces the amount of data of the object handling list acquired when displaying categories and groups, and the like, in the selection screen of the image data.

According to such characteristics, the display speed in displaying the categories, groups, and the like can be increased by the reduction in the amount of data of the object handling list. When the number of image data increases, the amount of data of the object handling list increases in proportion to such number. When the information related to the virtual folder F21 is contained in the object handling list by extending only the framework of the PTP, the amount of data of the object handling list doubles. Thus, if the number of image data is large, the great effects can be obtained by applying the technique of the present embodiment. The registration function of the virtual folder F21 that allows the user to freely set the categorization or the grouping is considered an important function for the imaging device 100. Thus, providing a solution to the above problem related to the acquisition process of the object handling list has a very important meaning.

4: FLOW OF CONTROL PROCESS BY IMAGING DEVICE 100

The flow of the control process by the imaging device 100 will now be described with reference to FIGS. 12 to 16. The timing of the data transmission carried out between the imaging device control unit 138 and the input/output control unit 156 mounted on the imaging device 100 and the timing of the calculation processing by each unit will be described in detail.

(Regarding Control Process after Power on)

First, the control process after power ON in the imaging device 100 will be described with reference to FIG. 12. FIG. 12 is an explanatory view showing the flow of process executed from when the power key 112 of the imaging device 100 is operated and the power is turned ON until the database as shown in FIG. 5 is built.

Figure 12:
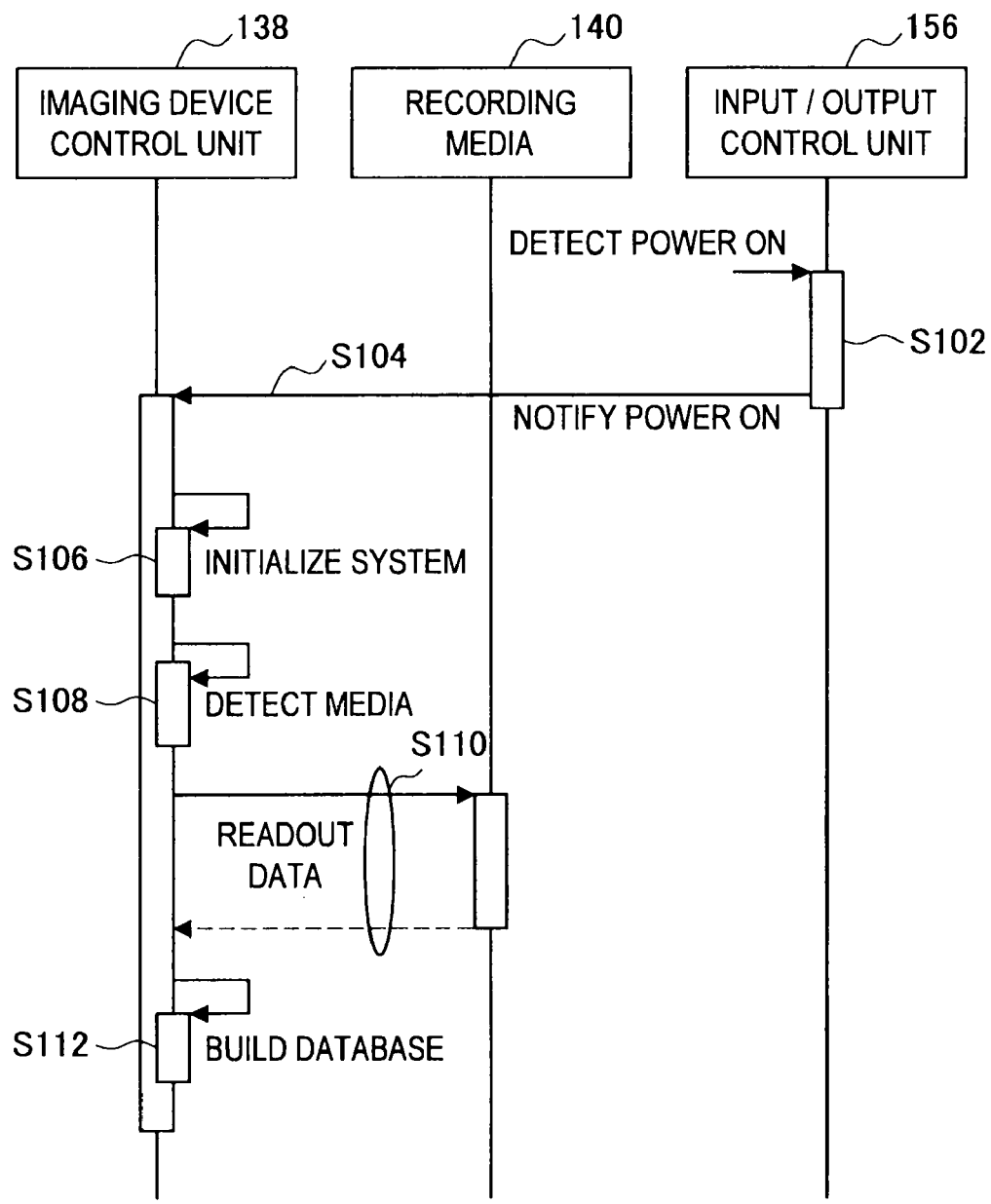
FIG. 12 shows one example of the control process related to the data transmission method of the embodiment.

As shown in FIG. 12, when the power ON is detected by the input/output control unit 156 (S102), the power ON notification is transmitted from the input/output control unit 156 to the imaging device control unit 138 (S104). The power ON notification referred herein is a notification signal for notifying operation of the power key 112 to the power ON position and transition of the power of the imaging device 100 to the ON state. The power ON notification is transmitted through the signal track of the UART method. When the power ON notification is transmitted from the input/output control unit 156 to the imaging device control unit 138, the imaging device control unit 138 executes the initialization process of the system (S106). The initialization process executed here is the process of initializing the setting of the lens unit 102, the imaging element 130, and the like.

When the initialization process of the system is completed in the imaging device control unit 138, the imaging device control unit 138 attempts to detect the recording media 140 connected to the imaging device 100 (S108). If the recording media 140 is detected, the imaging device control unit 138 reads out data from the recording media 140 (S110). In this case, the imaging device control unit 138 acquires the information of the actual folder F11 and the information of the virtual folder F21 in addition to the image data recorded in the recording media 140. The imaging device control unit 138 may also acquire information indicating the correspondence relationship between each image data and the actual folder F11 and the virtual folder F21. The imaging device control unit 138 then builds the database as shown in FIG. 5 based on the information acquired from the recording media 140 (S112), and records the same in the buffer memory 142.

The flow of process executed from when the power of the imaging device 100 is turned ON until the database related to the image data as shown in FIG. 5 is built has been described above.

(Regarding Display Control Process of Category Selection Screen)

Figure 13:
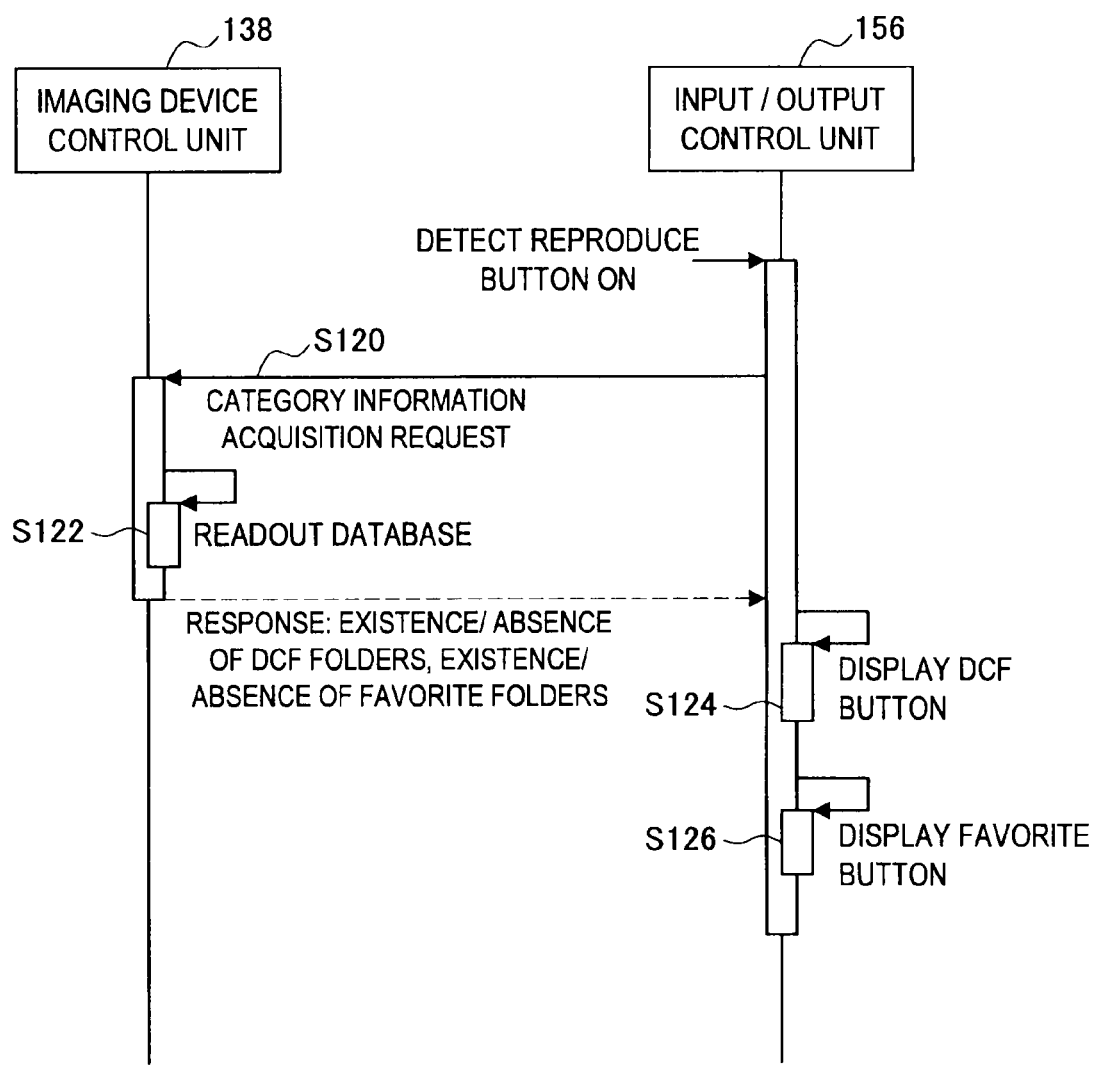
FIG. 13 shows one example of the control process related to the data transmission method of the embodiment.

The display control process of the category selection screen in the imaging device 100 will be described with reference to FIG. 13. FIG. 13 is an explanatory view showing the flow of process executed from when the reproduce key 104 of the imaging device 100 is operated to transition to the reproduction mode of the image data until the category selection screen D1 of FIG. 6 is displayed.

As shown in FIG. 13, when the reproduce button ON (operation of reproduce key 104) is detected by the input/output control unit 156, a category information acquiring request is transmitted from the input/output control unit 156 to the imaging device control unit 138 (S120). The category information acquiring request is a request signal for requesting the imaging device control nit 1 to notify of the number of actual folders F11 and the number of virtual folders F21. The category information acquiring request is transmitted through the signal track of the UART method.

When the category information acquiring request is transmitted from the input/output control unit 156 to the imaging device control unit 138, the imaging device control unit 138 reads out the database built in advance from the buffer memory 142 (S122). The imaging device control unit 138 detects the presence of the actual folder F11 ("DCF") and the presence of the virtual folder F21 ("favorite") (hereinafter referred to as category information) with reference to the read database, and transmits the same to the input/output control unit 156. The category information is transmitted to the input/output control unit 156 through the signal track of the UART method.

When category information is transmitted from the imaging device control unit 138 to the input/output control unit 156, the input/output control unit 156 displays the category selection screen D1 on the LCD162 based on the category information. In this case, if the actual folder F11 exists, the input/output control unit 156 displays the actual folder select button B11 ("DCF" button) according to the presence of the actual folder F11 contained in the category information (S124). Similarly, if the virtual folder F21 exists, the input/output control unit 156 displays the virtual folder select button B12 ("favorite" button) according to the presence of the virtual folder F21 contained in the category information (S126).

The flow of process executed from when the image data reproduction mode of the imaging device 100 is turned ON until the category selection screen D1 is displayed has been described above.

(Regarding Display Control Process of Virtual Folder Selection Screen)

Figure 14:
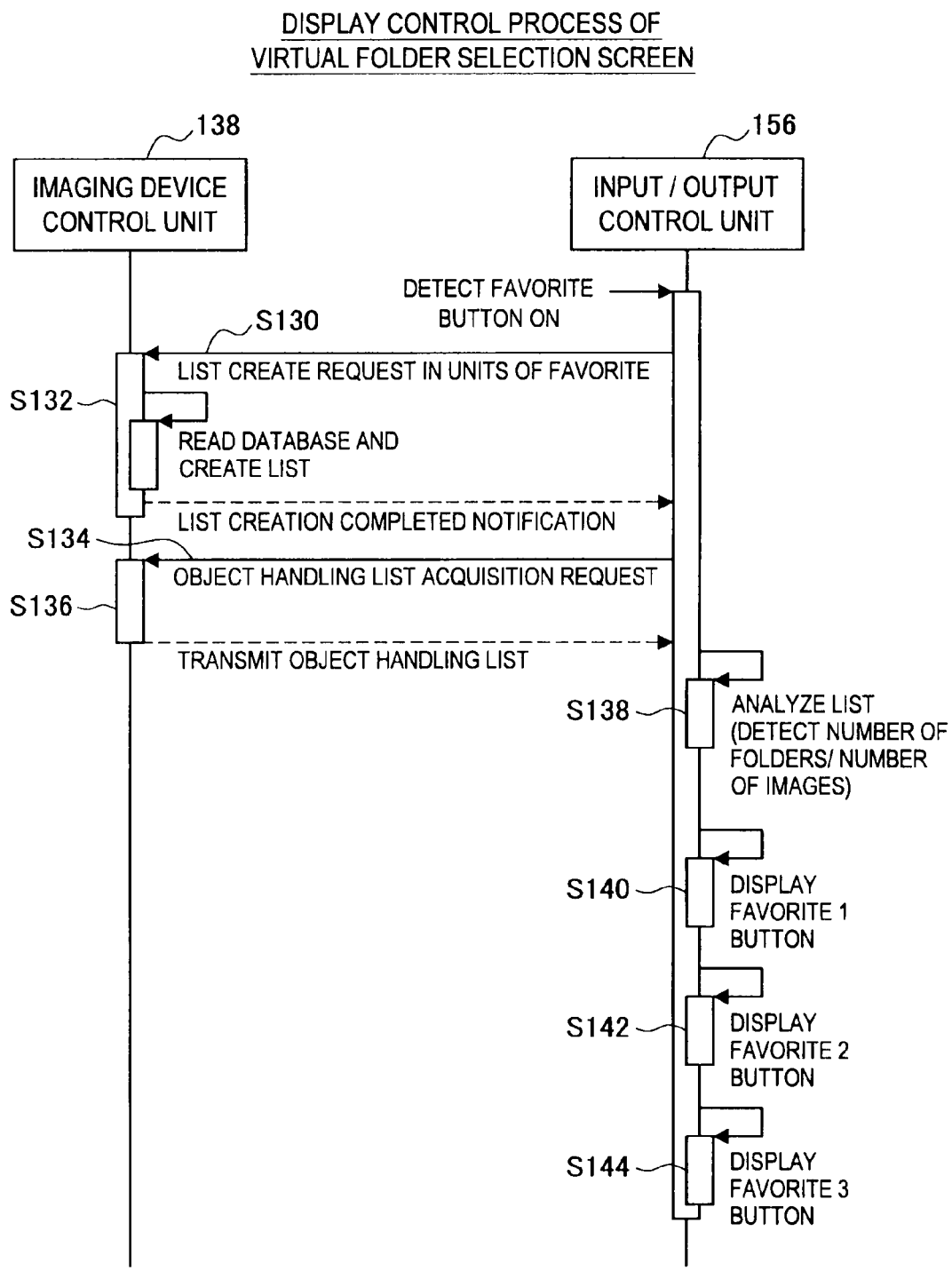
FIG. 14 shows one example of the control process related to the data transmission method of the embodiment.

The display control process of the virtual folder selection screen D21 in the imaging device 100 will now be described below with reference to FIG. 14. FIG. 14 is an explanatory view showing the flow of process executed from when the virtual folder select button B12 ("favorite" button) is pressed until the virtual folder selection screen D21 is displayed.

As shown in FIG. 14, when the virtual folder select button B12 ("favorite" button) is pressed, the input/output control unit 156 starts the display control process of the virtual folder selection screen D21. First, the input/output control unit 156 transmits the creation request of the object handling list related to the virtual folder F21 to the imaging device control unit 138 (S130). The creation request of the object handling list is transmitted through the signal track of the UART method.

When the creation request of the object handling list is transmitted from the input/output control unit 156 to the imaging device control unit 138, the imaging device control unit 138 reads database recorded in the buffer memory 142 (S132). The imaging device control unit 138 then creates the object handling list having a configuration specified in the creation request of the object handling list (S132). When the creation of the object handling list is completed, the imaging device control unit 138 transmits a list creation completed notification for notifying that the creation of the object handling list is completed to the input/output control unit 156 (S132). The list creation completed notification is transmitted through the signal track of the UART method.

When the list creation completed notification is transmitted from the imaging device control unit 138 to the input/output control unit 156, the input/output control unit 156 transmits the object handling list the acquiring request to the imaging device control unit 138 (S134). The object handling list acquiring request herein is a request signal for transmitting the object handling list. The object handling list acquiring request is transmitted through the signal track of USB method. When the object handling list acquiring request is transmitted from the input/output control unit 156 to the imaging device control unit 138, the imaging device control unit 138 transmits the object handling list created in the step S132 to the input/output control unit 156 (S136). The object handling list is transmitted through the signal track of the USB method.

When the object handling list is transmitted from the imaging device control unit 138 to the input/output control unit 156, the input/output control unit 156 analyzes the object handling list acquired, and detects the number of the virtual folders F21 (number of folders) (S138). The input/output control unit 156 also analyzes the object handling list, and detects the number of the actual folders F12 (number of images) registered in each virtual folder F21. The input/output control unit 156 then displays the virtual folder select button B21 ("favorite 1", "favorite 2", "favorite 3") based on the number of the virtual folders F21 detected from the object handling list (S140, S142, S144).

The flow of process executed while transitioning from the category selection screen D1 to the virtual folder selection screen D21 has been described above. As described above, when the technique of the present embodiment is applied, the data amount of the object handling list transmitted when displaying the virtual folder selection screen D21 can be decreased. Therefore, the transmission time of the object handling list between the input/output control unit 156 and the imaging device control unit 138 is reduced. As a result, the screen switching time in transitioning from the category selection screen D1 to the virtual folder selection screen D21 is greatly reduced, and the speed of screen transition to the virtual folder selection screen D21 is increased.

(Regarding Display Control Process of Image Selection Screen)

Figure 15:
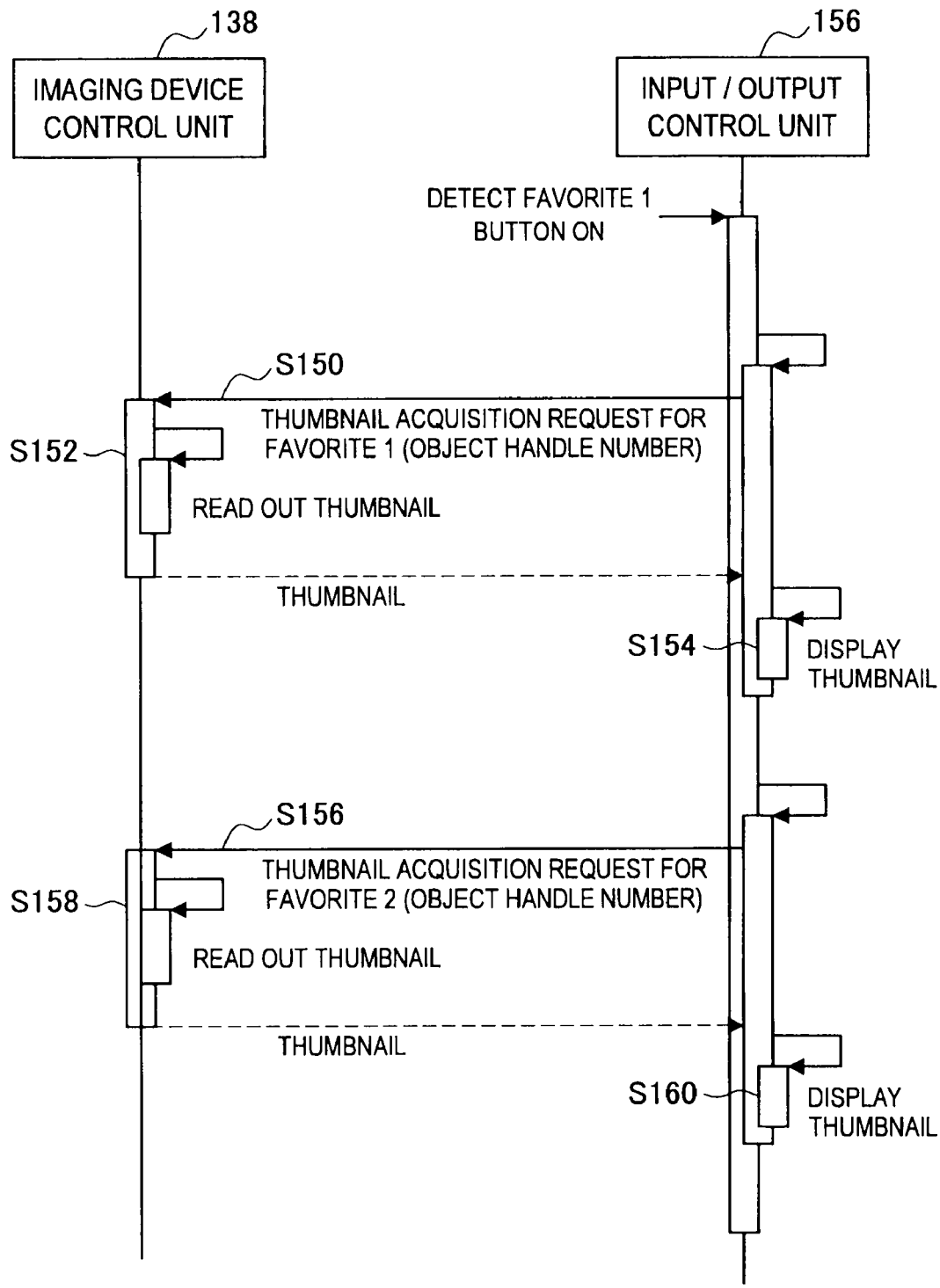
FIG. 15 shows one example of the control process related to the data transmission method of the embodiment.

The display control process of the image selection screen D31 in the imaging device 100 will now be described with reference to FIG. 15. FIG. 15 is an explanatory view showing the flow of process executed from when the virtual folder select button B21 ("favorite 1" button) is pressed until the image selection screen D31 is displayed.

As shown in FIG. 15, when the virtual folder select button B21 ("favorite 1" button) is pressed, the input/output control unit 156 transmits a thumbnail acquiring request to the imaging device control unit 138 (S150). The thumbnail acquiring request referred herein is a request signal for specifying the object handle number and transmitting the thumbnail image of the file corresponding to the specified number. When the thumbnail acquiring request is transmitted from the input/output control unit 156 to the imaging device control unit 138, the imaging device control unit 138 reads out the thumbnail image of the specified file from the recording media 140, and transmits to the input/output control unit 156 (S152). In step S150, the thumbnail image acquiring request corresponding to the file registered in "favorite 1" is transmitted.

When the thumbnail image is transmitted from the imaging device control unit 138 to the input/output control unit 156, the input/output control unit 156 displays the thumbnail image acquired from the imaging device control unit 138 on the LCD 162 as the image select button B31 (S154). If the image selection screen D31 contains great amount of blank region, the input/output control unit 156 acquires the thumbnail image registered in another virtual folder F21. For instance, the input/output control unit 156 transmits the thumbnail acquiring request targeting on "favorite 2" to the imaging device control unit 138 (S156).

When the thumbnail acquiring request is transmitted from the input/output control unit 156 to the imaging device control unit 138, the imaging device control unit 138 reads out the thumbnail image of the specified file from the recording media 140, and transmits the thumbnail image to the input/ output control unit 156 (S158). When the thumbnail image is transmitted from the imaging device control unit 138 to the input/output control unit 156, the input/output control unit 156 displays the thumbnail image acquired from the imaging device control unit 138 on the LCD 162 as the image select button B31 (S160). If the image selection screen D31 does not contain great amount of blank region, the input/output control unit 156 does not acquire the thumbnail image registered in another virtual folder F21, and completes the display process of the image selection screen D31.

The flow of process executed while transitioning from the virtual folder selection screen D21 to the image selection screen D31 has been described above. In the present embodiment, the thumbnail image can be easily acquired from the content of the already acquired object handling list, since the framework of the PTP is used in the process for acquiring the image data.

(Regarding Favorite Registration Process)

Figure 16:
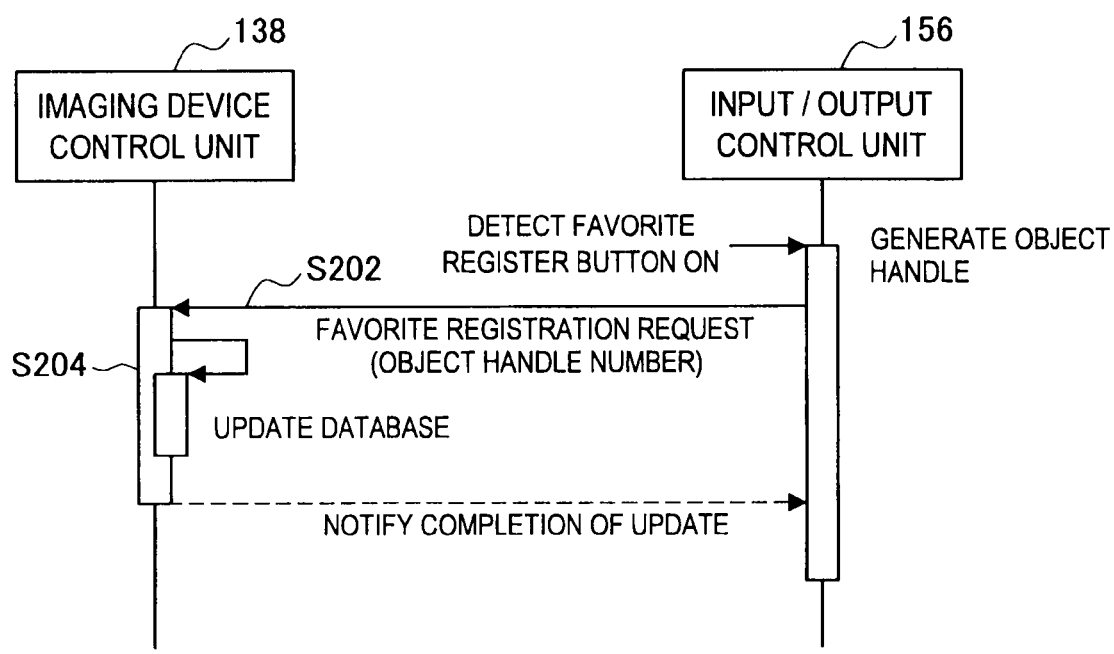
FIG. 16 shows one example of the control process related to the data transmission method of the embodiment.

The registration process of the virtual folder F21 ("favorite 1" etc.) in the imaging device 100 will be described below with reference to FIG. 16. FIG. 16 is an explanatory view showing the flow of process executed until the virtual folder F21 is registered. The example of the display configuration of the registration screen D41 is shown in FIG. 4, and thus reference is also to be made to FIG. 4.

As shown in FIG. 16, when the register button B41 ("favorite register button") is pressed, the input/output control unit 156 transmits a favorite registration request to the imaging device control unit 138 (S202). The "favorite registration request" referred to herein is a request signal for specifying the file displayed on the registration screen D41 and the virtual folder F21 selected by pressing the register button B41, and registering the specified file in the specified virtual folder F21. The file and the virtual folder F21 are specified using the object handle number.

When the favorite registration request is transmitted from the input/output control unit 156 to the imaging device control unit 138, the imaging device control unit 138 updates the database to register the file specified by the favorite registration request in the specified virtual folder F21 (S204). After the update process of the database is completed, the imaging device control unit 138 transmits an update complete notification for notifying that the update of the database is completed to the input/output control unit 156.

The registration process of the virtual folder F21 ("favorite 1" etc.) has been described above.

The flow of control process by the imaging device 100 has been described with reference to FIGS. 12 to 16 to clarify the timing of the data transmission carried out between the imaging device control unit 138 and the input/output control unit 156, and the timing of the calculation process by each unit. As described above, the object handling list of smaller amount of data is transmitted in the present embodiment, and thus the communication load and the time for such transmission process are reduced. Furthermore, the calculation load and the processing time for the analyzing process of the object handling list are reduced. As a result, the time for the acquiring process and the analyzing process of the object handling list is reduced, and the speed of the screen transition can be increased.

5: CONTROL PROCESS AND OPERATION INPUT

The flow of control process by the imaging device 100 will now be described with reference to FIGS. 17 to 20. The flow of the entire process including the input operation of the unit will be described here.

(Regarding Initialization Process in Time of Power on)

First, the flow of the initialization process executed when the power of the imaging device 100 is turned ON will be described with reference to FIG. 17. FIG. 17 is an explanatory view showing the flow of the initialization process executed when the power is ON.

Figure 17:
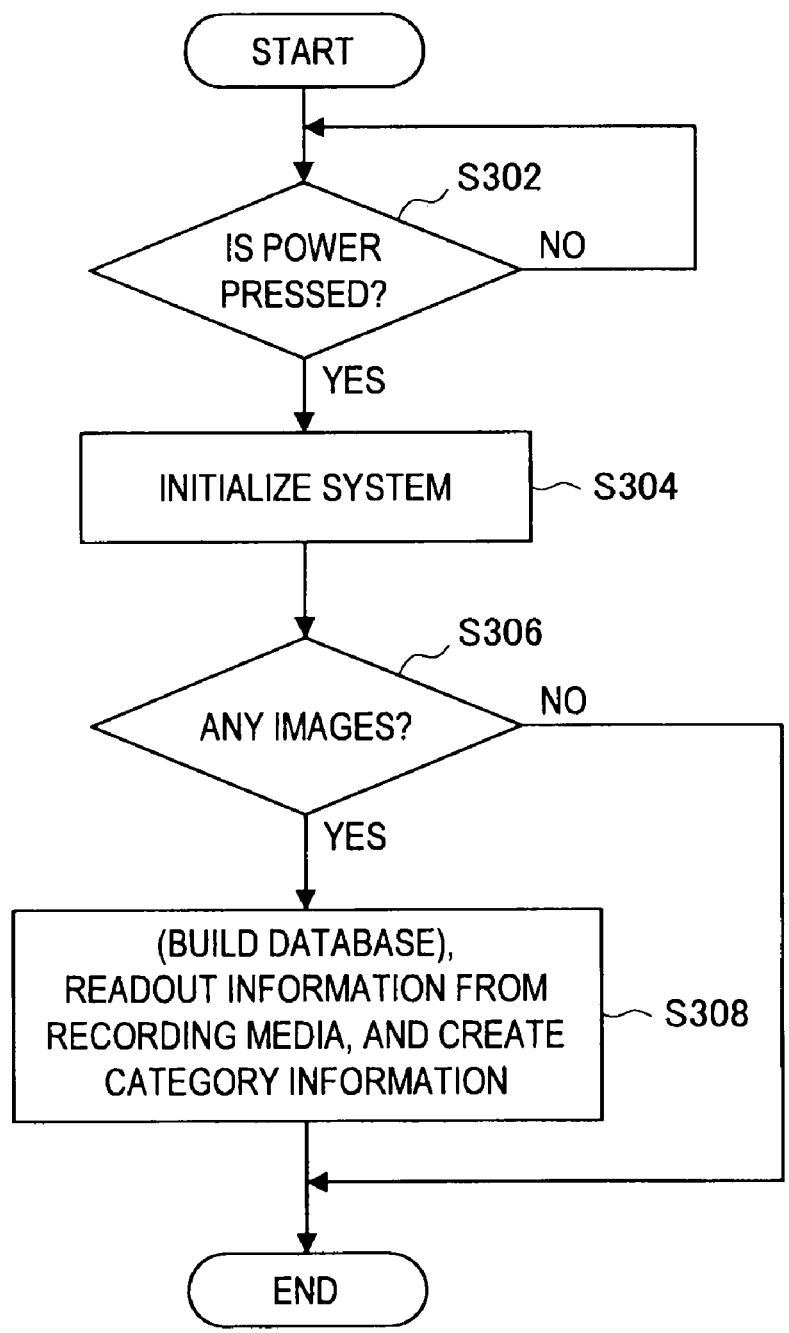
FIG. 17 shows one example of the control process related to the data transmission method of the embodiment.

As shown in FIG. 17, the imaging device 100 first determines whether or not the power key 112 is turned ON (S302). If the power key 112 is turned ON, the imaging device 100 proceeds to the process of step S304. If the power key 112 is turned OFF, the imaging device 100 again returns to step S203, and waits until the power key 112 is turned ON. In step S304, the initialization process of the system is executed by the imaging device 100 (S304). The initialization process executed here is a process of initializing the setting of the lens unit 102 and the like.

The imaging device 100 determines whether or not the image data is present in the recording media 140 (S306). If the image data is present, the imaging device 100 proceeds to the process of step S308. If the image data is not present in the recording media 140, the imaging device 100 terminates the initialization process in time of power ON. In step S308, the database is built by the imaging device 100 (S308). For instance, the information of the image data is read out from the recording media 140, and the information of the image data are organized in the form of database for every category classified by the actual folder F11 and the virtual folder F21. After the building of the database is completed, the imaging device 100 terminates the initialization process in time of power ON.

The flow of the initialization process executed when the power of the imaging device 100 is turned ON has been described above.

(Regarding Category Selection Process)

Figure 18:
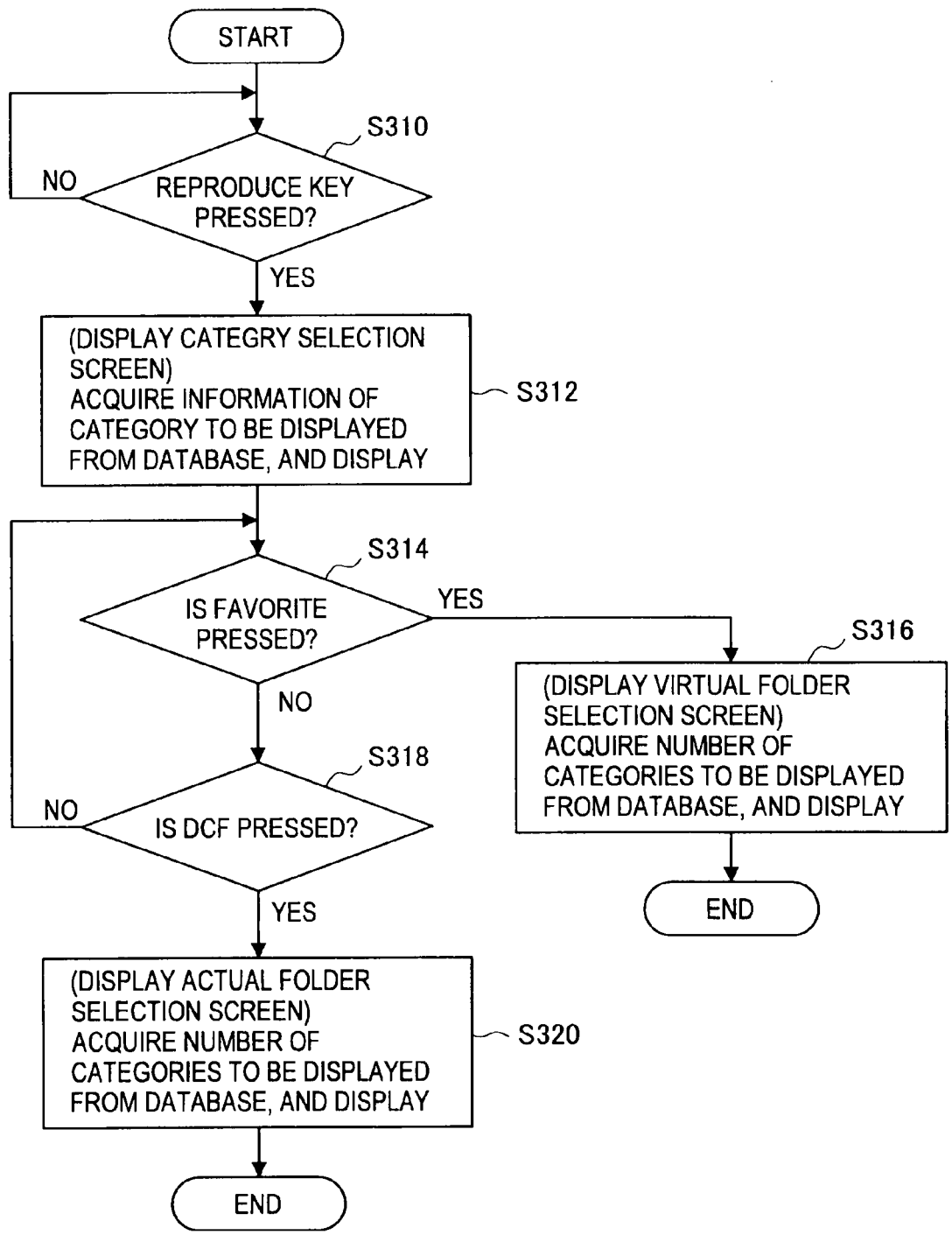
FIG. 18 shows one example of the control process related to the data transmission method of the embodiment.

The flow of the category selection process executed after the reproduce key 104 is pressed will be described below with reference to FIG. 18. FIG. 18 is an explanatory view showing the flow of the category selection process.

As shown in FIG. 17, the imaging device 100 first determines whether or not the reproduce key 104 is pressed (S310). If the reproduce key 104 is pressed, the imaging device 100 proceeds to the process of step S312. If the reproduce key 104 is not pressed, the imaging device 100 again returns to step S310 and waits until the reproduce key 104 is pressed. In step S312, the category selection screen D1 is displayed by the imaging device 100 (S312). In this case, the imaging device 100 acquires the information of the category to be displayed from the database, and displays the actual folder select button B11 ("DCF" button) and the virtual folder select button B12 ("favorite" button).

The imaging device 100 then determines whether or not the virtual folder select button B12 ("favorite" button) is pressed (S314). If the virtual folder select button B12 is pressed, the imaging device 100 proceeds to the process of step S316. If the virtual folder select button B12 is not pressed, the imaging device 100 proceeds to the process of step S318. In step S316, the display process of the virtual folder selection screen D21 is executed by the imaging device 100 (S316). Specifically, the object handling list related to the virtual folder F21 is acquired, and then the number of categories are detected based on the acquired object handling list. Furthermore, the virtual folder select button B21 is displayed based on the number of categories.

In step S318, the imaging device 100 determines whether or not the actual folder select button B11 ("DCF" button) is pressed (S318). If the actual folder select button B11 is pressed, the imaging device 100 proceeds to the process of step S320. If the actual folder select button B11 is not pressed, the imaging device 100 proceeds to the process of step S314. In step S320, the display process of the actual folder selection screen D22 is executed by the imaging device 100 (S320). Specifically, the object handling list related to the actual folder F11 is acquired, and then the number of categories are detected based on the acquired object handling list. Furthermore, the actual folder select button B22 is displayed based on the number of categories.

The process executed from when the reproduce key 104 is pressed until the category is selected, and part of the process executed after the category is selected have been described.
(Regarding Selection Process of Favorite Folder)

Figure 19:
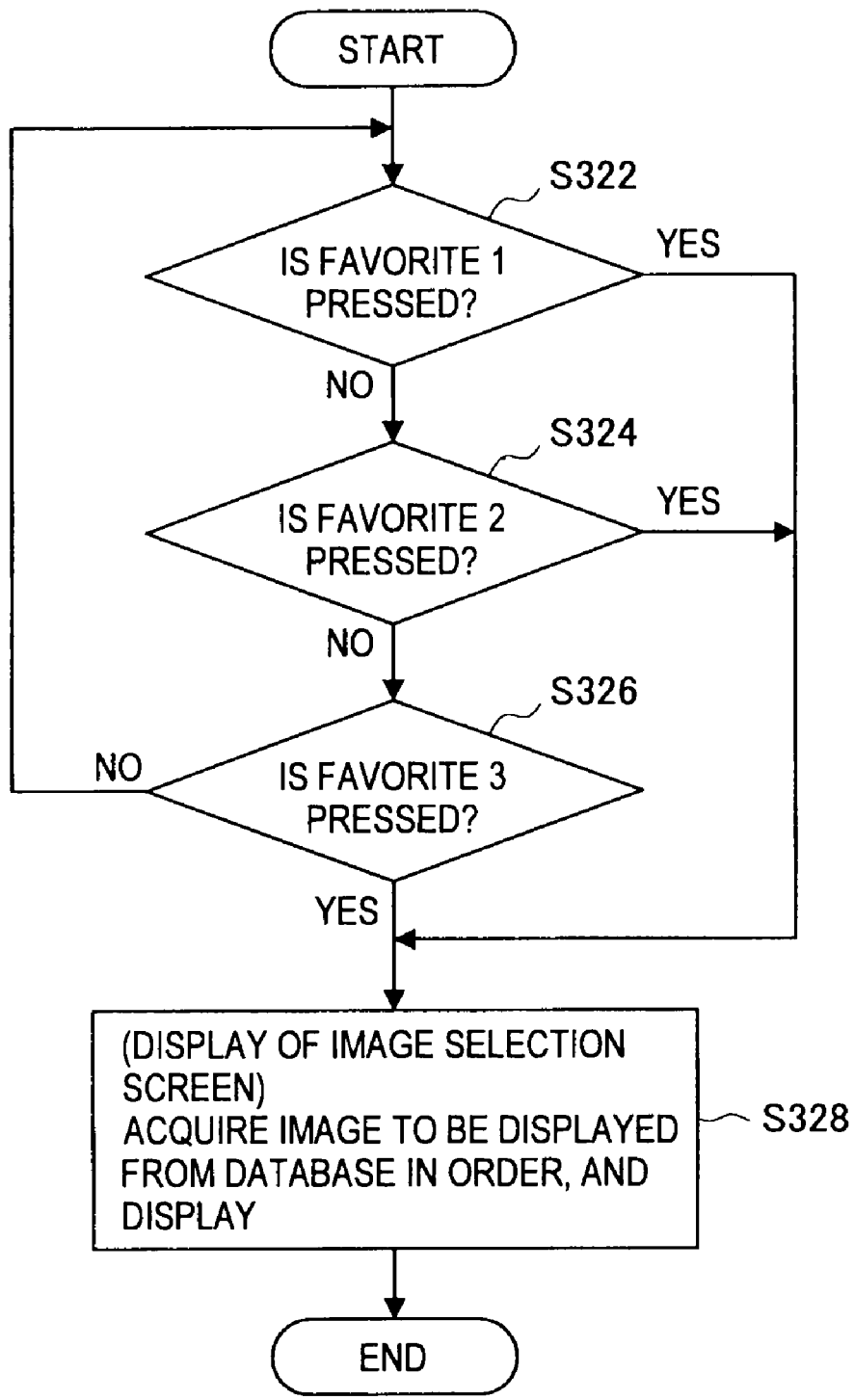
FIG. 19 shows one example of the control process related to the data transmission method of the embodiment.

The flow of process executed when the virtual folder select button B21 ("favorite 1", "favorite 2", "favorite 3") is selected in the virtual folder selection screen D21 will be described with reference to FIG. 19. FIG. 19 is an explanatory view showing the flow of selection process of the favorite folder. The process shown in FIG. 19 is executed after the process of step S316 shown in FIG. 18 is completed.

As shown in FIG. 19, first the imaging device 100 determines whether or not the virtual folder select button B21 of "favorite 1" is pressed (S322). The imaging device proceeds to the process of step S328 if the virtual folder select button B21 of "favorite 1" is pressed. The imaging device proceeds to the process of step S324 if the virtual folder select button B21 of "favorite 1" is not pressed.

In step S324, the imaging device 100 determines whether or not the virtual folder select button B21 of "favorite 2" is pressed (S324). The imaging device 100 proceeds to the process of step S328 if the virtual folder select button B21 of "favorite 2" is pressed. The imaging device 100 proceeds to the process of step S326 if the virtual folder select button B21 of "favorite 2" is not pressed.

In step S326, the imaging device 100 determines whether or not the virtual folder select button B21 of "favorite 3" is pressed (S326). The imaging device proceeds to the process of step S328 if the virtual folder select button B21 of "favorite 3" is pressed. The imaging device proceeds to the process of step S322 if the virtual folder select button B21 of "favorite 3" is not pressed.

In step S328, the display process of the image selection screen D31 is executed by the imaging device 100 (S328). In this case, the imaging device 100 acquires the image data, the thumbnail image, and the like to be displayed from the database, and displays the same on the LCD 162. After the display process of the image selection screen D31 is completed, the imaging device 100 terminates the selection process of the favorite folder. The flow of process executed from when the virtual folder select button B21 is pressed on the virtual folder selection screen D31 until the image selection screen D31 is displayed has been described above.
(Regarding Registration Process of Favorite Image)

Figure 20:
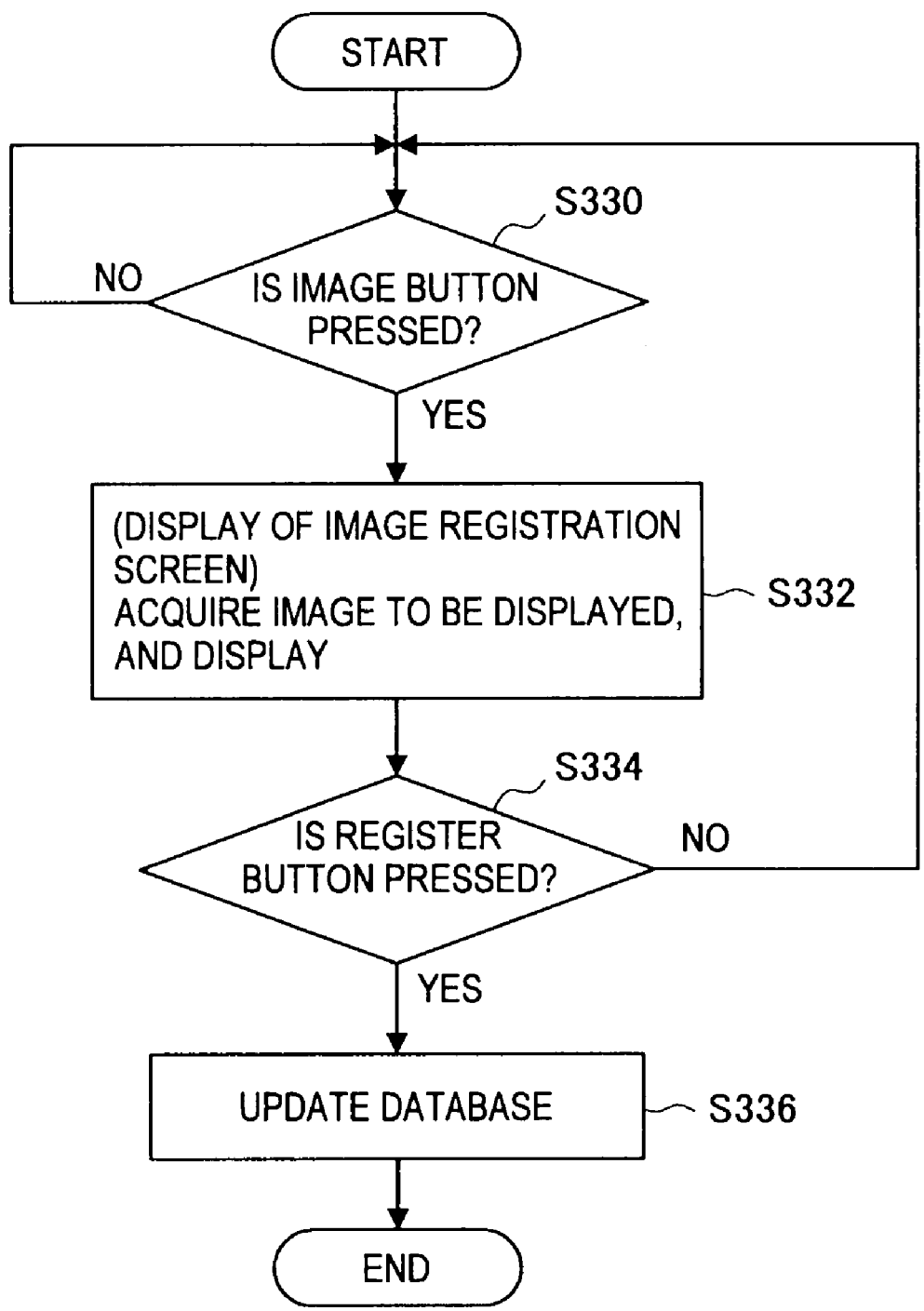
FIG. 20 shows one example of the control process related to the data transmission method of the embodiment.

The flow of registration process of the favorite image will now be described with reference to FIG. 20. FIG. 20 is an explanatory view showing the flow of registration process of the favorite image.

As shown in FIG. 20, the imaging device 100 first determines whether or not the image select button B31 is pressed on the image selection screen D31 (S330). The imaging device 100 proceeds to the process of step S332 if the image select button B31 is pressed. The imaging device 100 again returns to step S330 if the image select button B31 is not pressed, and waits until the image select button B31 is pressed. In step S332, the imaging device 100 displays the registration screen D41 of the image data (S332). In this case, the imaging device 100 acquires the image to be displayed, and displays the registration screen D41.

The imaging device 100 then determines whether or not the register button B41 is pressed (S334). The imaging device 100 proceeds to the process of step S336 if the register button B41 is pressed. The imaging device 100 again proceeds to the process of step S330 if the register button B41 is not pressed. In step S336, the imaging device 100 updates the database (S336). After the update process of the database is completed, the imaging device 100 terminates the registration process of the favorite image.

The flow of registration process of the favorite image has been described above.

As described above, if the technique of the present embodiment is applied, the data amount of the object handling list used when acquiring the information of the categorized image data through the signal track of the USB method can be reduced. Thus, when transitioning to the selection screen of category etc., the time for screen transition can be reduced by the transmission time of the object handling list and the analysis time. As a result, the speed of the screen transition is significantly increased, and the user does not feel stress when performing the operation of selecting image data.

6: CONCLUSION

Lastly, the function configuration of the imaging device of the present embodiment and the effects obtained by such function configuration will be briefly summarized.

First, the function configuration of the imaging device according to the present embodiment can be described as below. The imaging device is configured by a first processing unit and a second processing unit. The first processing unit includes a list creating unit and a list transmission unit having the following functions. Furthermore, the second processing unit includes a list creation requesting unit and a list transmission requesting unit having the following functions. The first and second processing units are connected by first and second signal lines.

With respect to the data divided to one or a plurality of groups, when the group is specified and the creation process of the data list is requested, the list creating unit creates the data list related to the data of the specified group. That is, the list creating unit does not create the data list related to all the data, but generates the data list containing the information related to the data of the specified group. Therefore, the data list created by the list creating unit has lesser amount of data compared to the data list related to all the data. As a result, the load and time related to the transmission process of the data list and the analysis process are reduced.

When the transmission request of the data list based on the PTP (Picture Transfer Protocol) is acquired through the first signal line, the above-described list transmission unit transmits the data list created by the list creating unit through the first signal line. Thus, the list transmission unit transfers the data list created by the above-described list creating unit. In general, the data list related to all the data is transmitted in the PTP. However, since the list transmission unit transmits the data list created by the list creating unit, the transmission time for transmission is short compared to when transmitting the data list related to all the data.

The list creation requesting unit specifies the group and requests for the creation process of the data list to the first process unit through a second signal line different from the first signal line. Thus, the list creation requesting unit does not request for the data list related to all the data, but specifies the data list related to the data of desired group and makes the creation request. However, in the framework of the PTP, the target range of the data contained in the data list is difficult to specify. Thus, the list creation requesting unit specifies the target range (group) of the data through the second signal line different from the first signal line related to the data transmission method of the PTP.

The list transmission requesting unit transmits the transmission request of the data list to the first process unit. The list transmission requesting unit, for instance, may make the transmission request of the data list in the framework of the PTP. This is because the creation request of the data list is made beforehand by the list transmission requesting unit, and the desired data list is already created by the list creating unit. That is, once the data list is created, the created data list is merely acquired in the framework of the PTP without adding a big change to the framework of the PTP. The time length until displaying of data due to the waiting of transmission of the data list is serious. However, the speed of the update process of the display is increased by the reduced transmission time of the data list according to the above configuration. Since the calculation load and the processing time for the analysis process of the data list are reduced by the smaller size of the data list, the speed is remarkably increased by the reduction effect of the transmission process.

The list creating unit may be configured to notify, after the creation process of the data list is completed, the second process unit of the completion of the creation process of the data list through the second signal line. In this case, the list transmission requesting unit transmits the transmission request of the data list after being notified that the creation process of the data list is completed from the list creating unit. When the completion of the creation of the data list is notified from the list creating unit, the transmission request of the data list may be executed immediately after receiving the notification. Thus, the time from the creation of the data list to the transmission request is reduced. If such configuration does not exist, the list transmission requesting unit transmits the list transmission request after waiting for a sufficiently long time in which the creation of the data list is assumed to be reliably completed. As a result, the extra waiting time arises until the transmission request of the data list is transmitted. That is, the time from transmitting the creation request of the data list until the data list is actually transmitted can be reduced with the above configuration.

When the group has a hierarchical structure, the list creating unit may be configured to generate a data list containing information related to a lower level group of the specified group. In this case, the second processing unit further includes a number of lower level group detection unit and a group object display unit having the following functions. The number of lower level group detection unit detects the number of lower level groups based on the data list acquired from the first processing unit. The group object display unit displays on the screen the group object for selecting the lower level group by the number of groups detected by the lower level group detection unit. Although the data list relates to data, as described above, the information of the lower level group may be contained if the group is hierarchized. In such case as well, the data amount of the data list is reduced by specifying the upper level group. According to such configuration, the transition speed of when transitioning to the display screen of the information of the lower level group can be enhanced when displaying the information of the lower level group on the screen.

The second processing unit may further include a number of data detection unit and a data object display unit having the following functions. The number of data detection unit detects the number of data belonging to the specified group based on the data list acquired from the first processing unit. The data object display unit displays on the screen the data object for selecting the data by the number of data detected by the number of data detection unit. Therefore, when displaying the data object for selecting the data instead of the data itself, the data object can be displayed as long as the number of data is known. In such case, the detection process of the number of data can be performed at high speed if the data amount of the data list is small, and thus the speed of the screen display can be further increased.

The first processing unit may further include a data object transmission unit for transmitting the data object through the first signal line. Furthermore, the second processing unit may further include a data object acquiring unit for acquiring the data object from the first processing unit through the first signal line. In this case, when the number of data detected by the number of data detection unit is greater than the number of data objects displayable on the screen, the data object acquiring unit acquires the data object by the number of data objects displayable on the screen. The data object display unit displays the data object acquired by the data object acquiring unit on the screen. Thus, if the number of data is large, and the data object does not fit within the screen when attempting to display the data object by the relevant number, the acquiring time of the data object can be reduced by not acquiring extra data objects. The speed of the screen display is increased as a result.

When the number of data detected by the number of data detection unit is smaller than the number of data objects displayable on the screen, the data object acquiring unit may acquire the data objects corresponding to the data of a group different from the specified group. In this case, the data object display unit displays the data objects corresponding to the different group on the screen in addition to the data objects corresponding to the specified group. A blank space creates in the screen if the number of data objects corresponding to the specified group is smaller than the number of data objects displayable on the screen. In particular, if the number of data registered in the group is small, the screen region becomes a waste. Thus, the screen region can be used without waste and the operability of the user can be enhanced according to the configuration described above.

The group may be a virtual folder corresponded with the data according to an arbitrary setting operation by the user irrespective of the folder in which the data is stored. Thus, a need to expand the framework of the PTP arises when the group attempts to provide a virtual folder that can be freely set by the user. For instance, the data list of the PTP is configured by the information of the actual folder automatically generated according to the number of data, and the data stored in each actual folder. A need to additionally describe the information of the virtual folder in the data list arises when handling the concept of the virtual folder without greatly changing the framework of the PTP. Thus, the relationship of the actual folder and the data, and the relationship of the virtual folder and the data are expressed with the data list, and the information related to the same data is redundantly described in the data list. If such data list is transmitted, the time for the transmission of the data list becomes longer than before, and the screen transition delays. However, the data list containing only the portion of the virtual folder can be set as the transmission target and the delay of the screen transition can be reduced by adopting the above-described configuration. Furthermore, the convenience of when the user searches for the data significantly enhances as the virtual folder can be defined.

(Remark)

The imaging device control unit 138 serves as the first processing unit. The input/output control unit 156 serves as the second processing unit. Therefore, the imaging device control unit 130 serves as the list creating unit, the list transmission unit, and the data object transmission unit. The input/output control unit 156 serves as the list creation requesting unit, the list transmission requesting unit, the number of lower level group detection unit, the group object display unit, the number of data detection unit, the data object display unit, and the data object acquiring unit. The category, the actual folder F11, and the virtual folder F21 are examples of a group. The object handling list serves as a data list. The signal track of the USB method serves as a first signal line. The signal track of the UART method serves as a second signal line. The actual folder select buttons B11, B22 and the virtual folder select buttons B12, B21 serve as group object. The image select buttons B31, B32 serve as data object. The touch panel 108 and the LCD 162 serve as the screen.

It should be understood by those skilled in the art that various modifications, combinations, sub-combinations and alterations may occur depending on design and other factors insofar as they are within the scope of the appended claims or the equivalents thereof.

The present application contains subjected matter related to that disclosed in Japanese Priority Patent Application JP 2008-253972 filed in the Japan Patent Office on Sep. 30, 2008, the entire contents of which is hereby incorporated by reference.

What is claimed is:

1. An imaging device comprising:
   a first processing unit including,
   a list creating unit for, when a group is specified and a creation process of a data list is requested for data divided into groups, creating a data list related to data of the specified group, and
   a list transmission unit for transmitting the created data list through a first signal line when a transmission request of the data list based on a PTP (Picture Transfer Protocol) is acquired through the first signal line; and
   a second processing unit including,
   a list creation requesting unit for specifying the group and requesting for the creation process of the data list with respect to the first processing unit through a second signal line different from the first signal line, and
   a list transmission requesting unit for transmitting the transmission request of the data list to the first processing unit.

2. The imaging device according to claim 1, wherein
   the list creating unit notifies that the creation process of the data list is completed to the second processing unit through the second signal line after the creation process of the data list is completed, and
   the list transmission requesting unit transmits the transmission request of the data list when notified that the creation process of the data list is completed.

3. The imaging device according to claim 2, wherein
   the list creating unit generates a data list containing information related to a lower level group of the specified group if the group has a hierarchical structure, and
   the second processing unit further includes,
   a number of lower level group detection unit for detecting number of lower level groups based on the data list acquired from the first processing unit, and
   a group object display unit for displaying a group object for selecting the lower level group on a screen based on the number of groups.

4. The imaging device according to claim 2, wherein the second processing unit further includes,
   a number of data detection unit for detecting number of data belonging to the specified group based on the data list acquired from the first processing unit, and
   a data object display unit for displaying a data object for selecting the data on a screen based on the number of data detected by the number of data detection unit.

5. The imaging device according to claim 4, wherein
   the first processing unit further includes a data object transmission unit for transmitting the data object through the first signal line,
   the second processing unit further includes a data object acquiring unit for acquiring the data object from the first processing unit through the first signal line,
   the data object acquiring unit acquires the data object by number of data objects displayable on the screen when the number of data is greater than the number of data objects displayable on the screen, and
   the data object display unit displays the data object acquired by the data object acquiring unit on the screen.

6. The imaging device according to claim 5, wherein
   the data object acquiring unit acquires a data object corresponding to data of a group different from the specified group when the number of data detected by the number of data detection unit is smaller than the number of data objects displayable on the screen, and
   the data object display unit displays the data object corresponding to the different group on the screen in addition to the data object corresponding to the specified group.

7. The imaging device according to claim 1, wherein the group is a virtual folder corresponded with the data according to an arbitrary setting operation by a user irrespective of a folder storing the data.

* * * * *